(12) United States Patent
Mitchell

(10) Patent No.: US 8,203,710 B1
(45) Date of Patent: Jun. 19, 2012

(54) COMPACT WIDE FIELD FAST HYPERSPECTRAL IMAGER

(75) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 862 days.

(21) Appl. No.: 11/450,991

(22) Filed: Jun. 12, 2006

(51) Int. Cl.
*G01J 3/28* (2006.01)
*G02B 21/22* (2006.01)
*G01B 11/28* (2006.01)

(52) U.S. Cl. ........ 356/328; 356/630; 359/621; 359/365; 359/649

(58) Field of Classification Search ............... 356/328
See application file for complete search history.

(56) References Cited

U.S. PATENT DOCUMENTS

| | | | |
|---|---|---|---|
| 3,748,015 A | 7/1973 | Offner | 350/55 |
| 4,123,164 A | 10/1978 | Tambor | 356/152 |
| 4,331,380 A | 5/1982 | Rees et al. | 350/96.25 |
| 4,447,126 A | 5/1984 | Heidrich et al. | 350/96.31 |
| 4,852,982 A | 8/1989 | Yamamoto et al. | 350/413 |
| 5,140,459 A | 8/1992 | Sagan | 359/434 |
| 5,144,479 A | 9/1992 | Aharon et al. | 359/424 |
| 5,329,353 A | 7/1994 | Ichimura et al. | 356/328 |
| 5,499,139 A * | 3/1996 | Chen et al. | 359/649 |
| 5,717,487 A | 2/1998 | Davies | 356/328 |
| 5,831,729 A * | 11/1998 | Kuze | 356/328 |
| 6,078,048 A | 6/2000 | Stevens et al. | 250/339.02 |
| 6,288,781 B1 | 9/2001 | Lobb | 356/326 |
| 6,552,788 B1 * | 4/2003 | Castle | 356/326 |
| 6,690,467 B1 | 2/2004 | Reel | 356/328 |
| 6,744,505 B1 * | 6/2004 | Wang et al. | 356/326 |
| 2003/0067612 A1 * | 4/2003 | Ivarsson | 356/600 |
| 2003/0184748 A1 | 10/2003 | McCarthy | 356/328 |
| 2005/0007605 A1 * | 1/2005 | Ivarsson | 356/630 |
| 2007/0171415 A1 * | 7/2007 | Chrisp | 356/328 |
| 2007/0211250 A1 * | 9/2007 | Teichmann et al. | 356/328 |
| 2008/0094626 A1 * | 4/2008 | Becker-Ross et al. | 356/328 |

FOREIGN PATENT DOCUMENTS

EP 0316507 B1 12/1993
JP 25338341 A 12/2005

OTHER PUBLICATIONS

Smith, W.J. (1990) Modern Optical Engineering, $2^{nd}$ Ed. New York: McGraw Hill, Inc. pp. 165-166.
Jenkins, F.A. et al. (1976) Fundamentals of Optics, $4^{th}$ Ed. New York: McGraw-Hill Book Co. Chapter 7, p. 115.

* cited by examiner

*Primary Examiner* — Gregory J Toatley
*Assistant Examiner* — Rebecca C Bryant
(74) *Attorney, Agent, or Firm* — Burns & Levinson LLP; Jacob N. Erlich; Orlando Lopez

(57) ABSTRACT

A spectrometer having substantially increased spectral and spatial fields.

4 Claims, 24 Drawing Sheets

COMPACT WIDE FIELD FAST HYPERSPECTRAL IMAGER

STATEMENT REGARDING FEDERALLY SPONSORED RESEARCH OR DEVELOPMENT

This invention was made partially with U.S. Government support from the Air Force Research Lab under Contract No. F33615-99-C-1410. The U.S. Government has certain rights in the invention.

BACKGROUND OF THE INVENTION

This invention relates generally to spectrometers.

A spectrometer is a known device that is commonly used to examine the spectral, or wavelength dependent, content of light. Light emitted or reflected by a given object or scene is imaged by some means onto the entrance of the spectrometer, usually a slit element that transmits a single line image from the object or scene. The spectrometer in turn re-images this light to another location while dispersing this light according to its wavelength in a direction orthogonal to the orientation of the slit element, where it can readily be observed or recorded.

Because every material has a unique spectral signature, the spectrometer has become a very useful scientific tool in a broad range of scientific and industrial applications including, but not limited to, the monitoring of regional and global environmental conditions, the identification of both airborne and terrestrial objects and threats in surveillance imagery for military applications, the assessment of unknown substances in forensic applications, the precise characterization of color spectra in colorimetry, and even in the assessment of crop health and irrigation scheduling in the farming industry.

Current optically fast spectrometer designs are either too large in size for many applications, including but not limited to, unmanned aircraft surveillance, and forensic fieldwork, or their dispersing elements are too complex and costly to fabricate for commercial applications, or they do not provide enough spatial and spectral imaging resolution or quality to meet the required system performance, or they cannot provide a combination of these characteristics simultaneously.

For example, consider some applications of hyperspectral imaging in which it is desirable to have a spectrometer that simultaneously possesses a large spectral bandwidth such as the combined visible, near infrared and shortwave infrared bands, a large spatial field so that a large ground area can be covered with a single fly-over, high spatial and spectral resolutions so that small spatial and spectral features can be resolved, negligible spectral and spatial distortions to facilitate recognition algorithms, a fast optical speed so that high velocity fly-overs are possible, a very small size and mass so that the system can be transported in an unmanned aerial vehicles (UAV) or be man-portable, and is readily manufacturable from low-cost components.

There is therefore a need for a spectrometer design that is more compact in physical size than current spectrometers.

Furthermore, there is also a need for a spectrometer design that is lower in mass than current spectrometers.

Furthermore, there is also a need for a spectrometer design that eliminates the need for complex and costly dispersing elements.

Furthermore, there is also a need for a spectrometer design that provides a high degree of spatial and spectral image quality that is relatively free of spatial and spectral image distortions.

Furthermore, there is also a need for a spectrometer design that provides larger spatial and spectral fields than current spectrometers.

Furthermore, there is also a need for a spectrometer design that operates over multiple bands of wavelength, forming a separate spectral image for each band or a single extended multi-band image.

Still further, there is also a need for a spectrometer design that provides a combination of the characteristics described above.

BRIEF SUMMARY OF THE INVENTION

The needs set forth above as well as further and other needs and advantages of the present invention are achieved by the embodiments of the invention described herein below.

Reflective spectrometer design forms, like the Offner configuration, suffer from the size constraints inherent to the prevention of beam obscuration. Each reflective element must be positioned to avoid blocking the light reflected by another element, which causes the elements to be more spatially separated than in a similar refractive system.

Furthermore, current optically fast and physically compact spectrometer design forms, like the Offner and Dyson configurations, require curved dispersion elements. These can be very difficult and costly to build, particularly in the long-wave infrared wavelengths (8 to 12 micrometers). The present invention, in one embodiment, can utilize plane dispersing elements including, but not limited to, simple planar blazed ruled diffraction gratings.

While previous spectrometers designs have been shown to use a standard photographic telephoto camera lens in a double pass configuration, they do not provide a substantially large spatial field. This is primarily a result of the inability of this design form to effectively balance the axial chromatic aberration of the system with its inherent Petzval curvature, both of which are magnified by the double passing of light through the system. As the size of these systems are decreased, the Petzval curvature, which represents the curvature of the paraxial focal locus, continues to increase making wide spatial fields difficult to capture on a planar detecting element, particularly for optically fast systems. This curvature can be balanced against the axial chromatic aberration of the system, which produces a varying focus for each wavelength, such that the spectral focus is maintained planar, but the spatial field is left unbalanced and subject to the Petzval curvature of the system. In this manner, these conventional systems are substantially limited in spatial field.

The embodiments of the present invention result in substantially increased spectral and spatial fields of the spectrometer. These embodiments, due to the compact nature of refractive systems and the ability to use non-curved dispersing elements makes wide field spectrometers of the present invention more compact and less costly than current designs, while providing superior spatial and spectral image quality and resolution.

For a better understanding of the present invention, together with other and further needs thereof, reference is made to the accompanying drawings and detailed description and its scope will be pointed out in the appended claims.

DETAILED DESCRIPTION OF THE INVENTION

Figure 1:
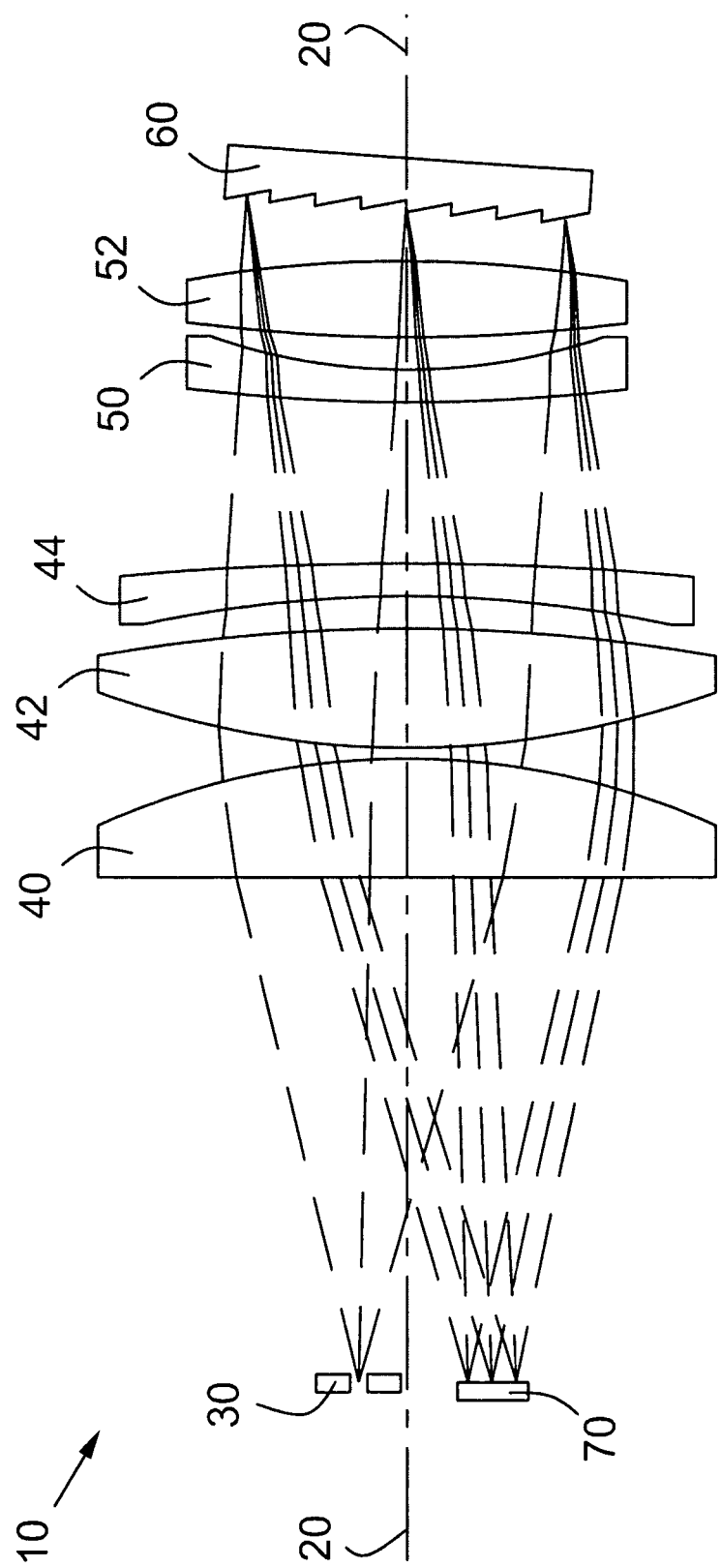
FIG. 1 is a schematic sectional view of a previously presented compact spectrometer, taken along the optical axis in the plane parallel to the direction of dispersion.

Reference is made to FIG. 1, which represents a previously presented compact fast imaging spectrometer system 10, taken along the optical axis 20 in the plane parallel to the direction of dispersion. In operation, electromagnetic radiation, typically in the ultraviolet, visible, and/or infrared bands, hereinafter referred to generally as light, emanating from the object position 30, typically a slit or other method of extracting a line image, hereinafter referred to generally as a slit element, is substantially collimated through an optical system comprised of a combination of optical elements, in this embodiment consisting of refractive elements 40, 42, 44, 50, and 52, onto a reflective dispersing element or any method of angularly separating light energy according to its wavelength, hereinafter referred to generally as a dispersing element 60. This dispersed light is then imaged as it passes a second time through the same optical system onto a CCD array, phosphorescent screen, photographic film, microbolometer array, or other means of detecting light energy, hereinafter referred to generally as a detecting element 70.

Figure 2A:
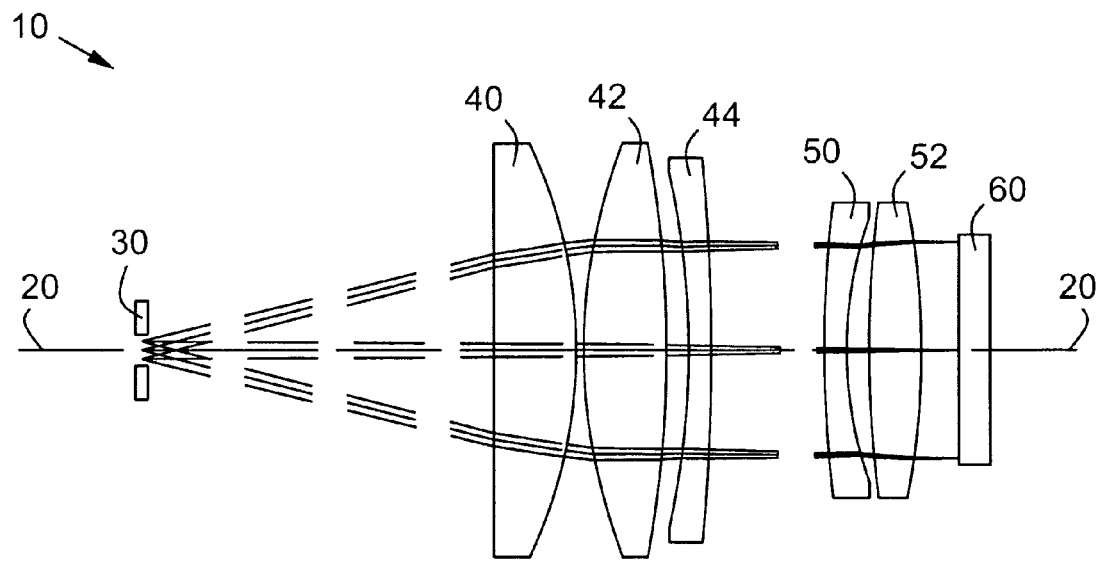
FIGS. 2A-2B are schematic sectional views of the compact spectrometer illustrated in FIG. 1, taken along the optical axis in the plane perpendicular to the direction of dispersion.
Figure 2B:
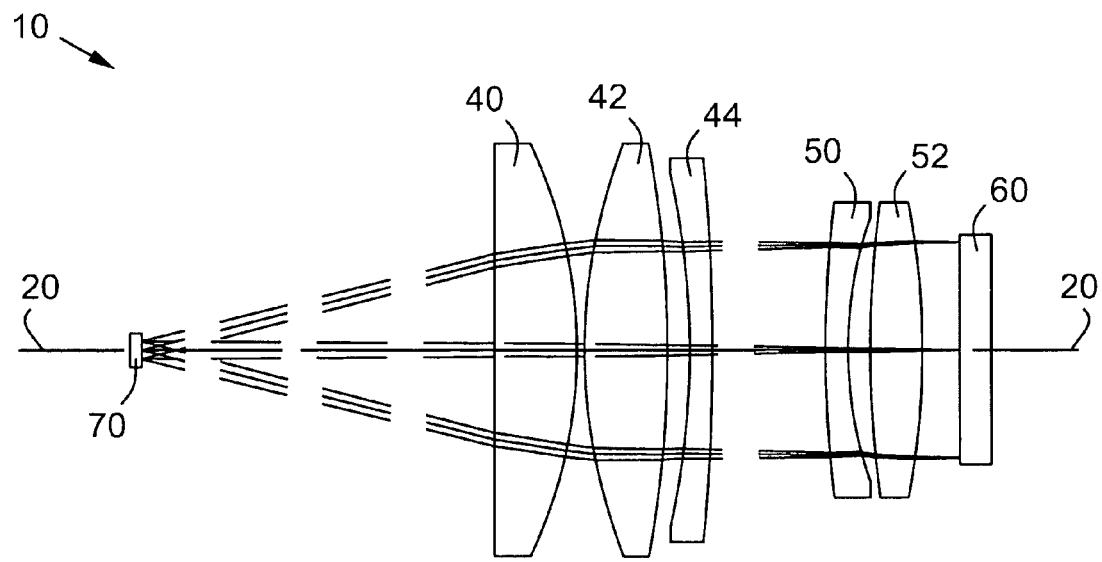

Reference is made to FIGS. 2A-2B, which are schematic sectional views of this same previously presented compact fast imaging spectrometer system 10, taken along the optical axis 20 in the plane perpendicular to the direction of dispersion. In operation and referring to FIG. 2A, light emanating from the slit element 30 is substantially collimated as it passes through the optical system onto the reflective dispersing element 60. Referring to FIG. 2B, this dispersed light is then imaged as it passes a second time through the same optical system onto the detecting element 70.

The compactness of this design results from its use of a Petzval or other imaging type lens in a double pass configuration. Compact refractive lens systems such as the Petzval lens, which are well known in the art, typically suffer from an optical aberration referred to as field curvature, or sometimes Petzval curvature, which can severely limit the spatial field of the system. In system 10 of FIG. 1, the severe Petzval curvature of the system is somewhat balanced against the axial chromatic aberration of the system to provide a moderately flat field in the spectral dimension. In the spatial dimension, however, the severe Petzval curvature of this system results in an extremely limited spatial field as illustrated in FIGS. 2A-2B.

Since Petval curvature is inversely proportional to the index of refraction of the optical elements that comprise the system, the spatial field of these systems can be improved by using high index materials. This is particularly effective in the mid-wave infrared (3-5 µm) and long-wave infrared (8-13 µm) spectral bands where very high index materials such as silicon and germanium are available.

Figure 3:
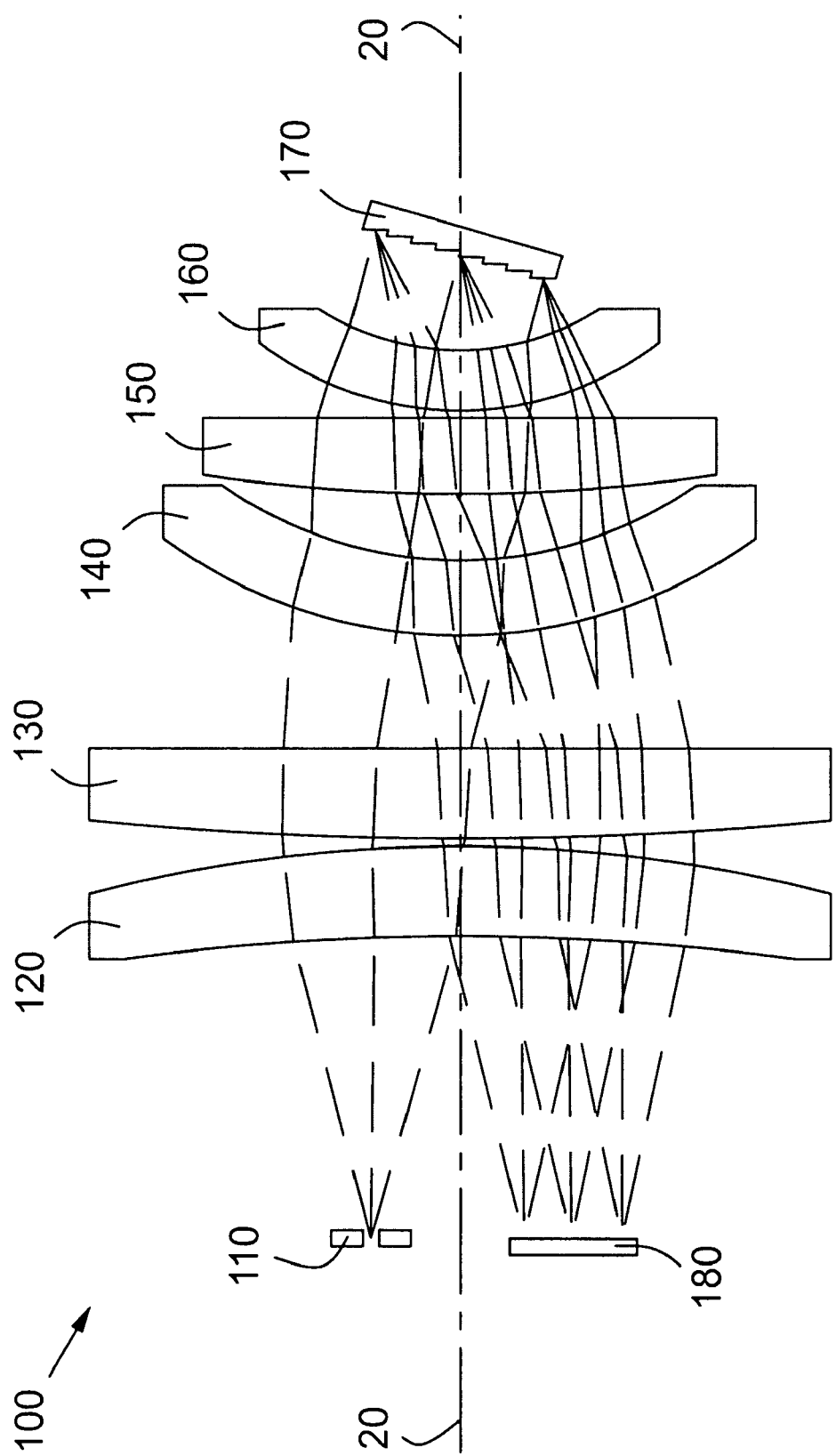
FIG. 3 is a schematic sectional view of a compact wide field spectrometer in accordance with an embodiment of the present invention, taken along the optical axis in the plane parallel to the direction of dispersion.

Reference is made to FIG. 3, which is a schematic sectional view of an embodiment of this invention 100, taken along the optical axis 20 in the plane parallel to the direction of dispersion. In operation, light emanating from the slit element 110 is substantially collimated through an optical system comprised of a combination of optical elements, in this embodiment consisting of refractive elements 120, 130, 140, 150, and 160, onto a dispersing element 170. This dispersed light is then imaged as it passes a second time through the same optical system onto a detecting element 180.

Figure 4A:
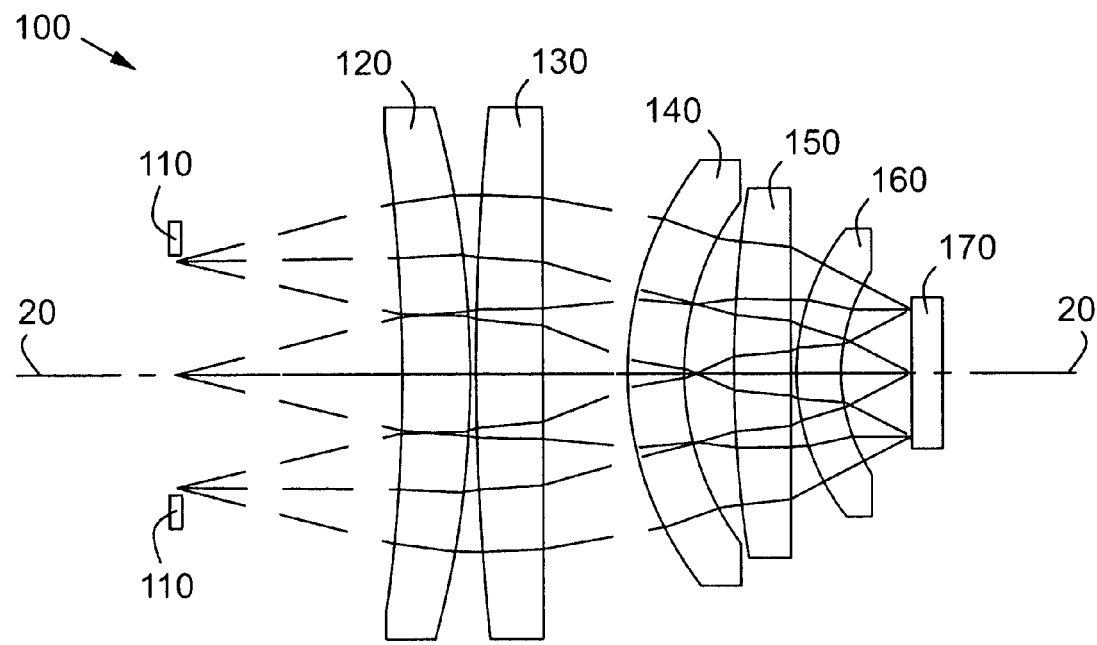
FIGS. 4A-4B are schematic sectional views of the embodiment of the present invention illustrated in FIG. 3, taken along a plane perpendicular to the direction of dispersion.
Figure 4B:
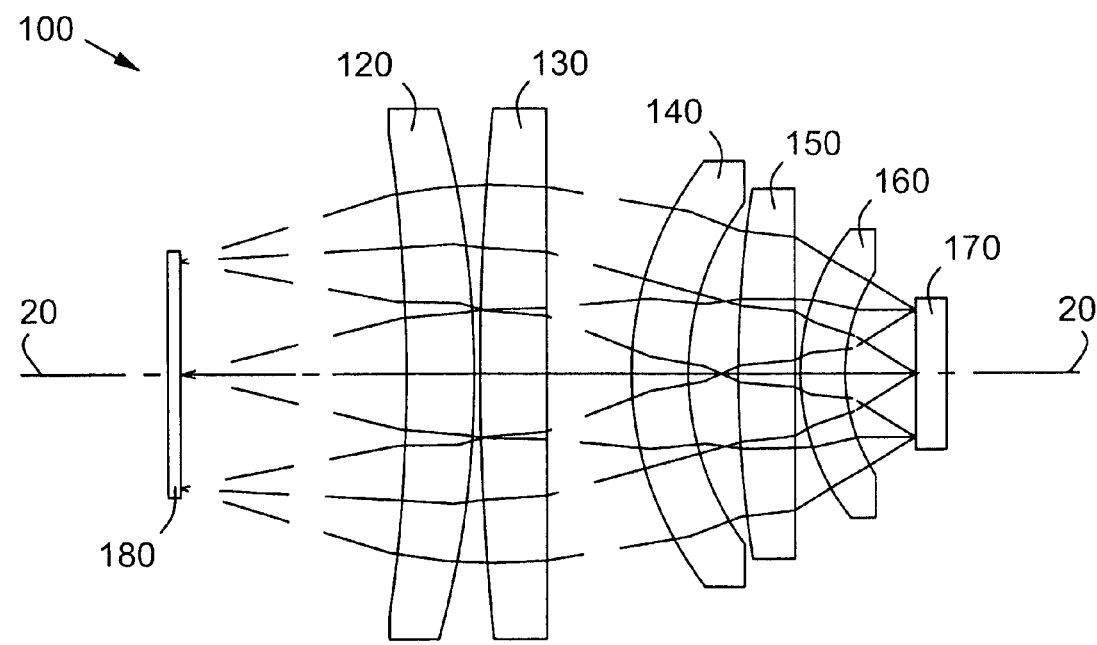

Reference is made to FIGS. 4A-4B, which are schematic sectional views of this same embodiment 100, taken along the optical axis 20 in the plane perpendicular to the direction of dispersion. In operation and referring to FIG. 4A, light emanating from the slit element 110 is substantially collimated as it passes through the optical system onto the reflective dispersing element 170. Referring to FIG. 4B, this dispersed light is then imaged as it passes a second time through the same optical system onto the detecting element 180. The reduced Petzval curvature of this system, which results in part from the use of high index materials, increases the size of the spatial field over the conventional systems.

In the visible through short-wave infrared (0.4-2.5 µm) spectral band, where extremely high index materials are not readily available, a further modification can be made to balance the Petzval curvature of the system against the axial chromatic aberration in order to provide increased spectral and spatial fields. The process of achromatizing a refractive lens system is well known in the art, whereby two materials having different dispersive properties and optical powers are used to reduce the axial chromatic aberration of a system by bringing the focus of two wavelengths together at a common point, often referred to as achromatic, or two-color, correction. This approach can be expressed by the equality $$f_{\lambda 1} = f_{\lambda 2}$$

where f represents the focal length of the system, and is commonly achieved for a thin lens doublet comprised of two elements A and B whose optical powers are related by their dispersive properties such that $$\frac{\phi_A}{\phi_B} = -\frac{\nu_A}{\nu_B}$$

where $\phi$ represents the element's optical power and $\nu$ represents the material's Abbe number, which is a measure of dispersion known in the art.

Figure 5A:
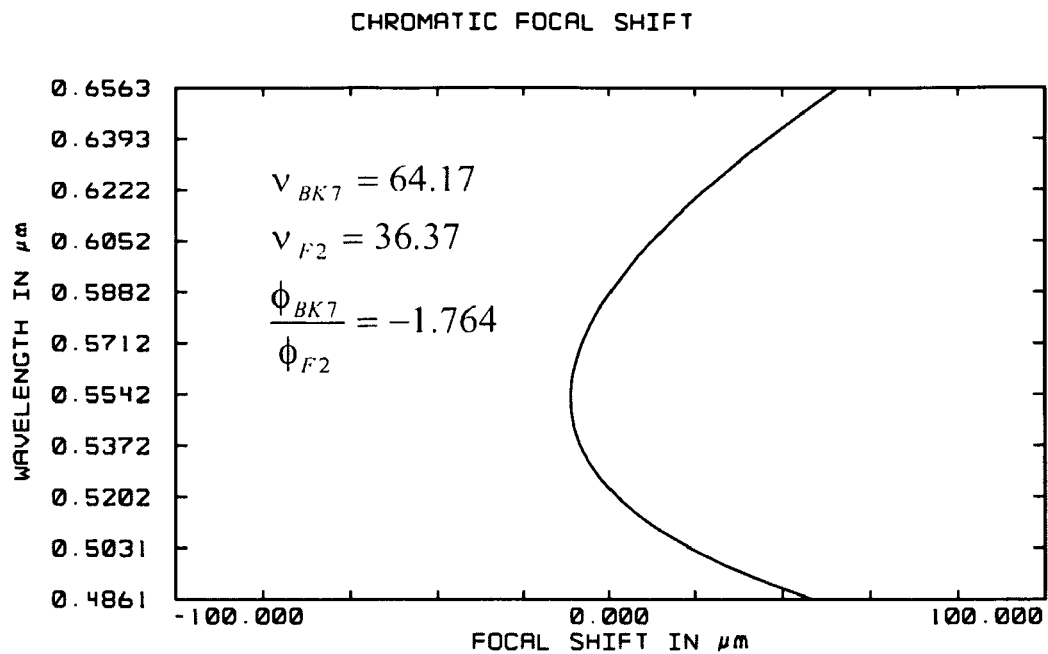
FIGS. 5A-5B are schematic graphical representations of the chromatic focal shift for chromatically corrected optical doublets using a standard correction method and a linear correction method of the present invention.

Reference is made to FIG. 5A, which represents the focus as a function of wavelength, or chromatic focal shift, of a 100 mm focal length thin lens cemented doublet consisting of Schott BK7 and F2 glasses and corrected using this standard achromatic correction method. The schematic graphical representation in FIG. 5A reveals a focus range of ±31 µm over the best fit image plane.

While further correction can be achieved by bringing the focus at three wavelengths together at a common point, often referred to as apochromatic, or three-color, correction of the system, this degree of correction typically requires the use of exotic and often expensive materials, as well as increased element powers, which result in increased system aberrations.

In a spectrometer system, however, since the imagery is dispersed in one direction according to wavelength, a modification can be made to these color correction techniques whereby the focus at three wavelengths are brought together such that they lie substantially on a common line rather than at a common point. In this manner, the slope of the focal length versus wavelength is substantially equal at three predetermined wavelengths. This allows for a linearly varying amount of axial chromatic aberration in the system that can be easily compensated for by tilting the image plane appropriately. This approach can be expressed by the equality $$\frac{f_{\lambda 1} - f_{\lambda 2}}{\lambda_1 - \lambda_2} = \frac{f_{\lambda 2} - f_{\lambda 3}}{\lambda_2 - \lambda_3} = \frac{f_{\lambda 3} - f_{\lambda 1}}{\lambda_3 - \lambda_1}$$

where f represents the focal length of the system and $\lambda$ represents the wavelength of light. This equality can be similarly achieved for a thin lens doublet comprised of two elements A and B whose optical powers are related by their dispersive properties such that $$\frac{\phi_A}{\phi_B} \cong -\frac{\kappa_A}{\kappa_B}$$

where $\phi$ represents the element's optical power and $\kappa$ represents a new measure of a material's dispersive properties defined by $$\kappa \equiv \frac{\nu}{\frac{\lambda_1 - \lambda_2}{\lambda_1 - \lambda_3} - P_{1,2}}$$

where $\lambda$ represents the wavelength of light and $\nu$ and P represent the material's Abbe number and partial dispersion respectively, both of which are measures of dispersion known in the art ($P_{1,2}$ is a partial dispersion of a material over $\lambda_1, \lambda_2$ relative to $\lambda_1, \lambda_3$. For Abbe number and partial dispersion see, for example, W. J. Smith, Modern Optical Engineering, Second Edition, ISBN 0-07-059174-1, pp. 165-166, which is incorporated by reference herein).

Figure 5B:
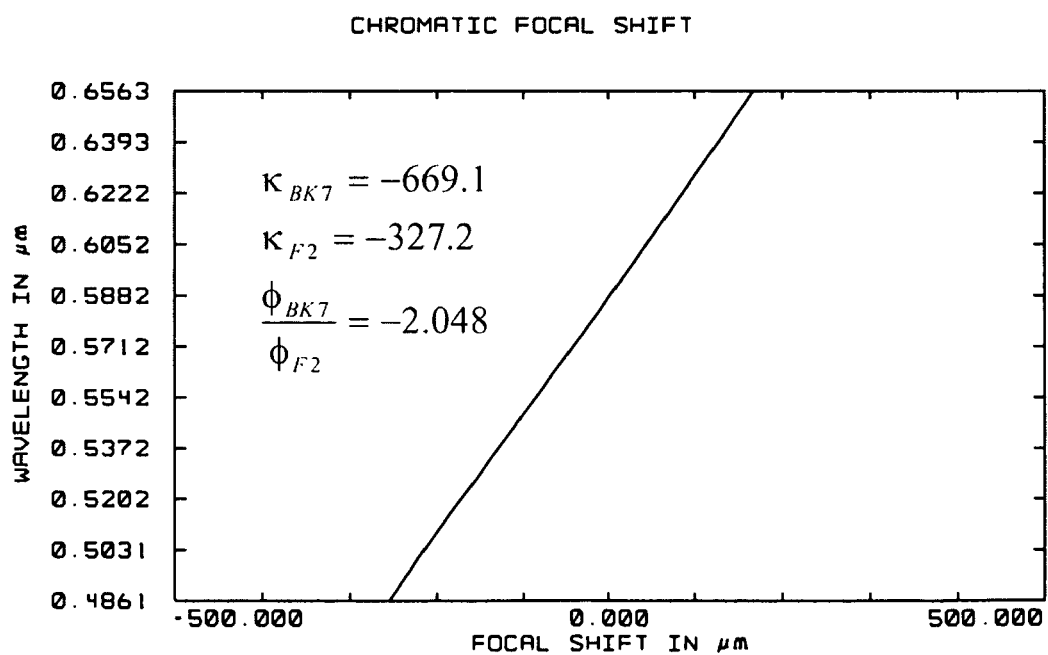

Reference is made to FIG. 5B, which represents the focus as a function of wavelength, or chromatic focal shift, of a 100 mm focal length thin lens cemented doublet consisting of Schott BK7 and F2 glasses and corrected using the linear correction method of this invention. The schematic graphical representation in FIG. 5B reveals a focus range of ±2.5 µm over the best fit image plane, which represents greater than an order of magnitude improvement over the standard achromatic correction method.

As a result, the apochromatic, or three-color, correction of dispersed imaging systems using the above described method of this invention can be achieved using methods and materials similar to those ordinarily used for simple achromatic, or two-color, correction of standard imaging systems. In this manner, a greater degree of chromatic correction can be achieved without the need for exotic and often expensive materials. Furthermore, the balancing of this correction method with the Petzval curvature of the system can be used to significantly improve the spatial and/or spectral fields, as well as the overall performance of spectrometer, hyperspectral, and other dispersed imaging systems.

Figure 6:
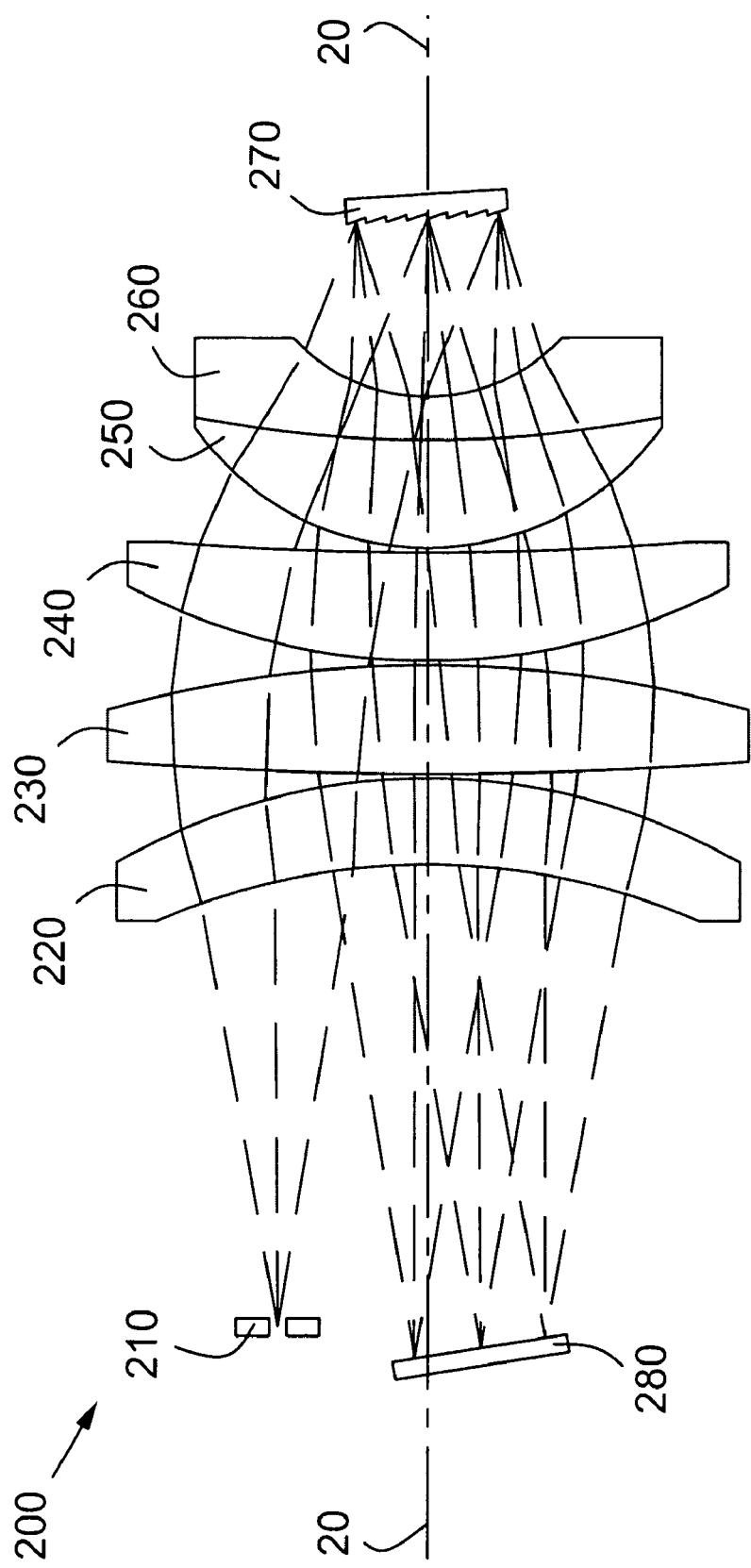
FIG. 6 is a schematic sectional view of a compact wide field spectrometer in accordance with a further embodiment of the present invention, taken along the optical axis in the plane parallel to the direction of dispersion.

Reference is made to FIG. 6, which is a schematic sectional view of a further embodiment of this invention 200, taken along the optical axis 20 in the plane parallel to the direction of dispersion. In operation, light emanating from the slit element 210 is substantially collimated through an optical system comprised of a combination of optical elements, in this embodiment consisting of refractive elements 220, 230, 240, 250, and 260, onto a dispersing element 270. This dispersed light is then imaged as it passes a second time through the same optical system onto a tilted detecting element 280. The apochromatic balancing of the system axial color with the image plane tilt significantly increases the size of the spectral field over the conventional systems.

Figure 7A:
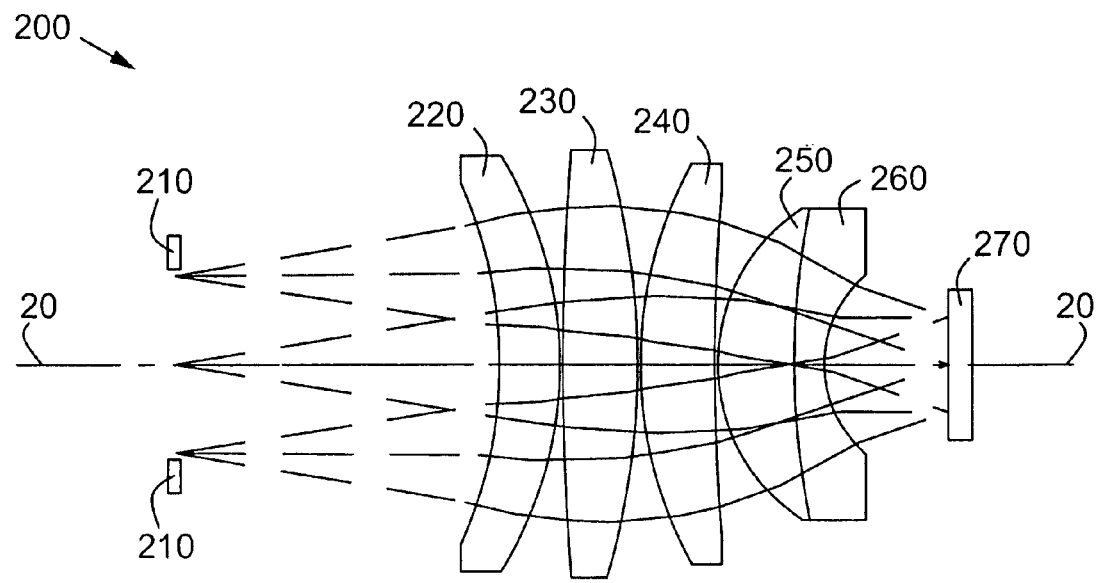
FIGS. 7A-7B are schematic sectional views of the embodiment of the present invention illustrated in FIG. 6, taken along a plane perpendicular to the direction of dispersion.
Figure 7B:
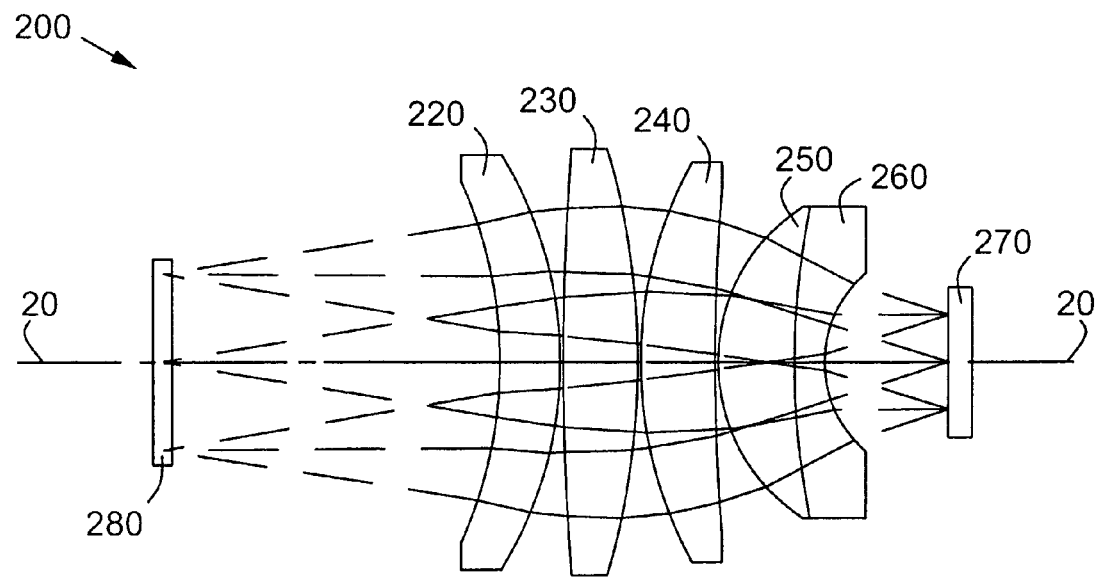

Reference is made to FIGS. 7A-7B, which are schematic sectional views of this same embodiment 200, taken along the optical axis 20 in the plane perpendicular to the direction of dispersion. In operation and referring to FIG. 7A, light emanating from the slit element 210 is substantially collimated as it passes through the optical system onto the reflective dispersing element 270. Referring to FIG. 7B, this dispersed light is then imaged as it passes a second time through the same optical system onto the detecting element 280. The reduced Petzval curvature of this system, which results in part from the use of higher index materials, increases the size of the spatial field over the conventional systems.

Figure 8:
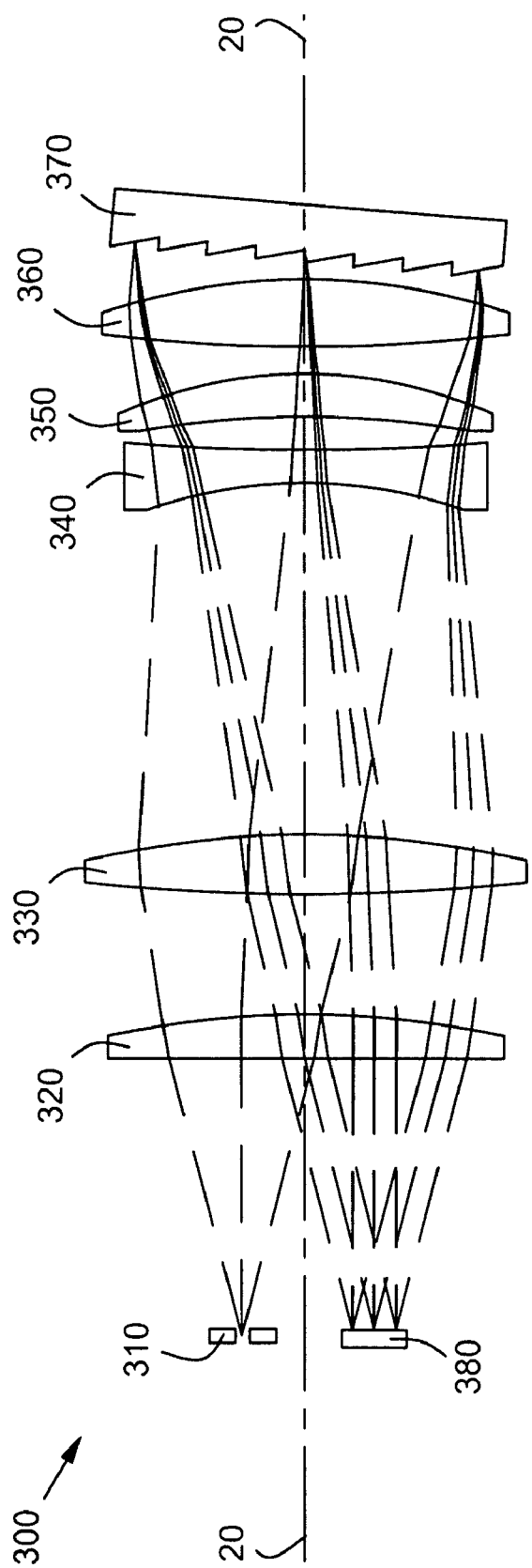
FIG. 8 is a schematic sectional view of a compact wide field spectrometer in accordance with a further embodiment of the present invention, taken along the optical axis in the plane parallel to the direction of dispersion.

The inherent Petzval curvature of compact refractive systems can also be accommodated using curved slit elements in order to increase the size of the spatial field. Reference is made to FIG. 8, which is a schematic sectional view of a further embodiment of this invention 300, taken along the optical axis 20 in the plane parallel to the direction of dispersion. In operation, light emanating from the slit element 310 is substantially collimated through an optical system comprised of a combination of optical elements, in this embodiment consisting of refractive elements 320, 330, 340, 350, and 360, onto a dispersing element 370. This dispersed light is then imaged as it passes a second time through the same optical system onto a detecting element 380.

Figure 9A:
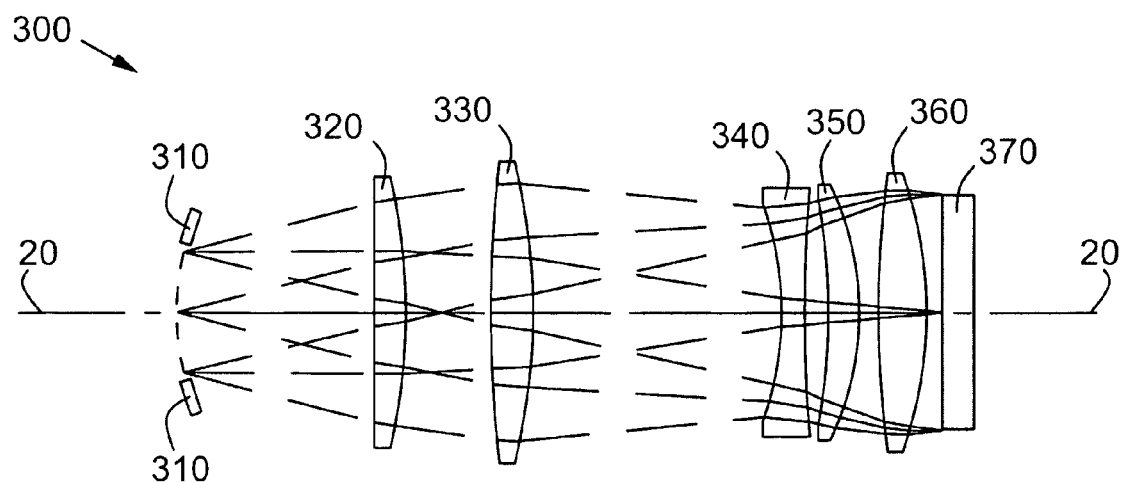
FIGS. 9A-9B are schematic sectional views of the embodiment of the present invention illustrated in FIG. 8, taken along a plane perpendicular to the direction of dispersion.
Figure 9B:
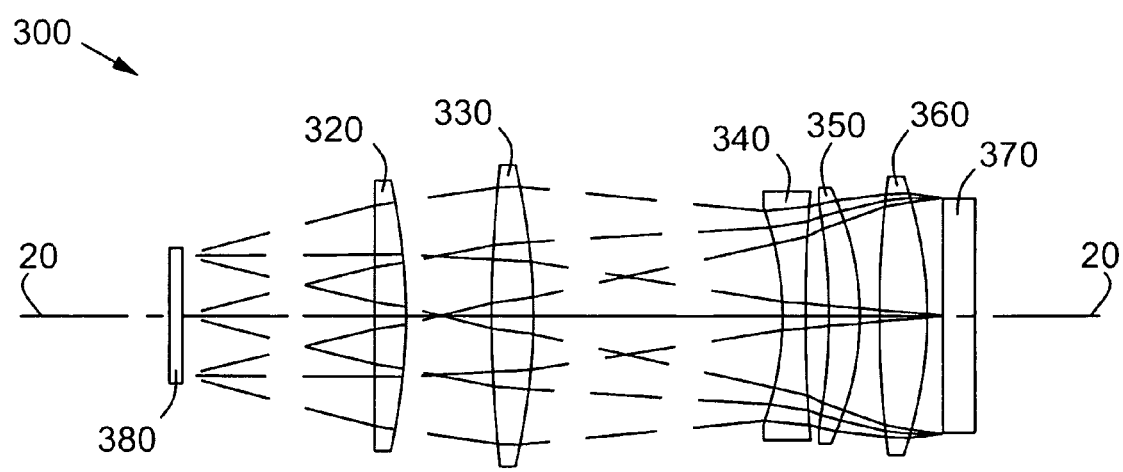

Reference is made to FIGS. 9A-9B, which are schematic sectional views of this same embodiment 300, taken along the optical axis 20 in the plane perpendicular to the direction of dispersion. In operation and referring to FIG. 9A, light emanating from the curved slit element 310 is substantially collimated as it passes through the optical system onto the reflective dispersing element 370. Referring to FIG. 9B, this dispersed light is then imaged as it passes a second time through the same optical system onto the detecting element 380. The curvature of the slit element 310 is balanced against the Petzval curvature of this system to increase the size of the spatial field over the conventional systems.

These differences over the conventional systems can be combined to further increase the spectral and spatial fields of these imaging spectrometer systems, thereby relieving many of the aberration correction constraints on the optical elements to further increase the system compactness, optical speed, and overall performance of these systems.

Figure 10:
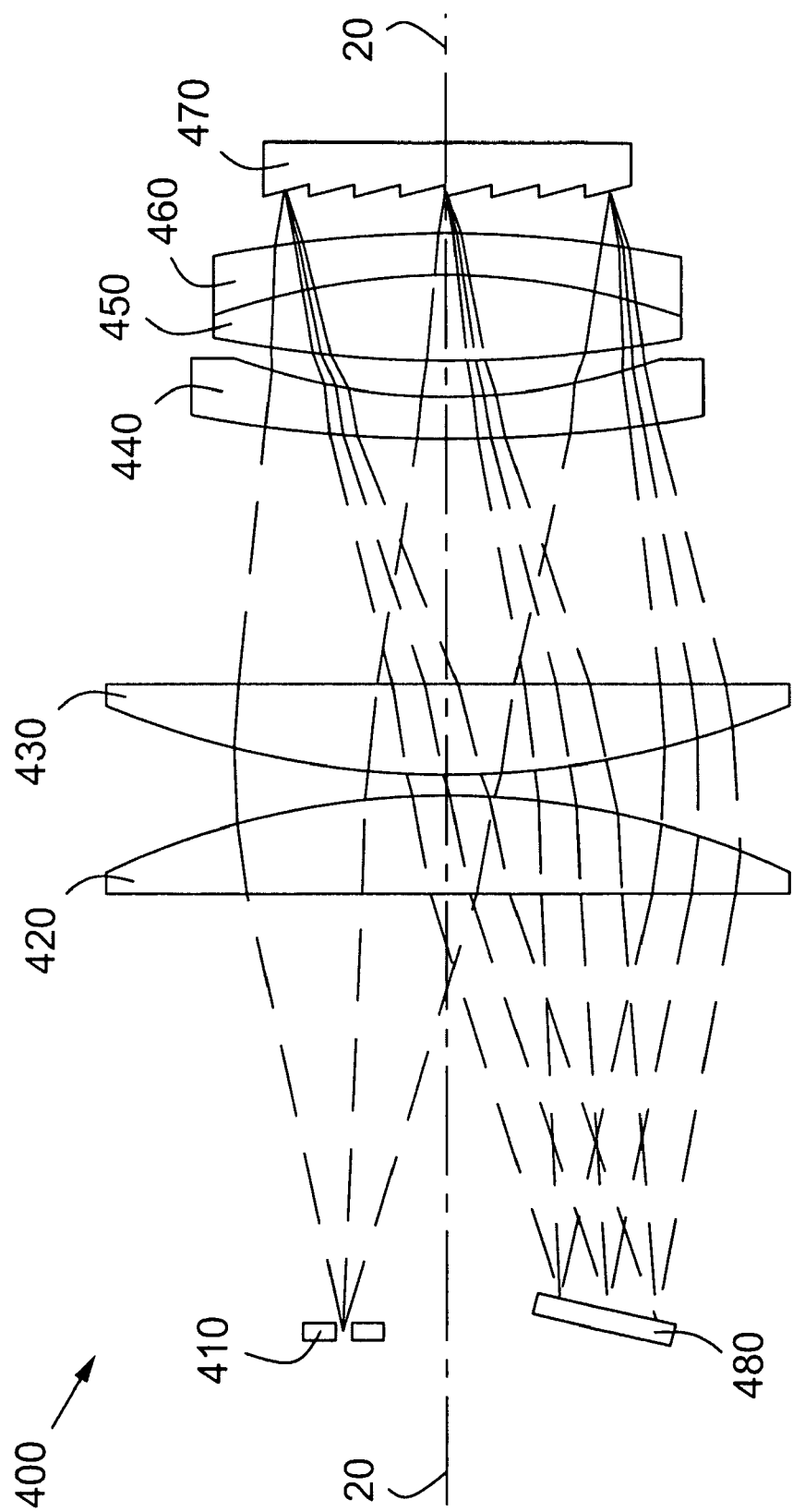
FIG. 10 is a schematic sectional view of a compact wide field spectrometer in accordance with a further embodiment of the present invention, taken along the optical axis in the plane parallel to the direction of dispersion.

Reference is made to FIG. 10, which is a schematic sectional view of a further embodiment of this invention 400, taken along the optical axis 20 in the plane parallel to the direction of dispersion. In operation, light emanating from the slit element 410 is substantially collimated through an optical system comprised of a combination of optical elements, in this embodiment consisting of refractive elements 420, 430, 440, 450, and 460, onto a dispersing element 470. This dispersed light is then imaged as it passes a second time through the same optical system onto a tilted detecting element 480. The apochromatic balancing of the system axial color with the image plane tilt significantly increases the size of the spectral field over the conventional systems.

Figure 11A:
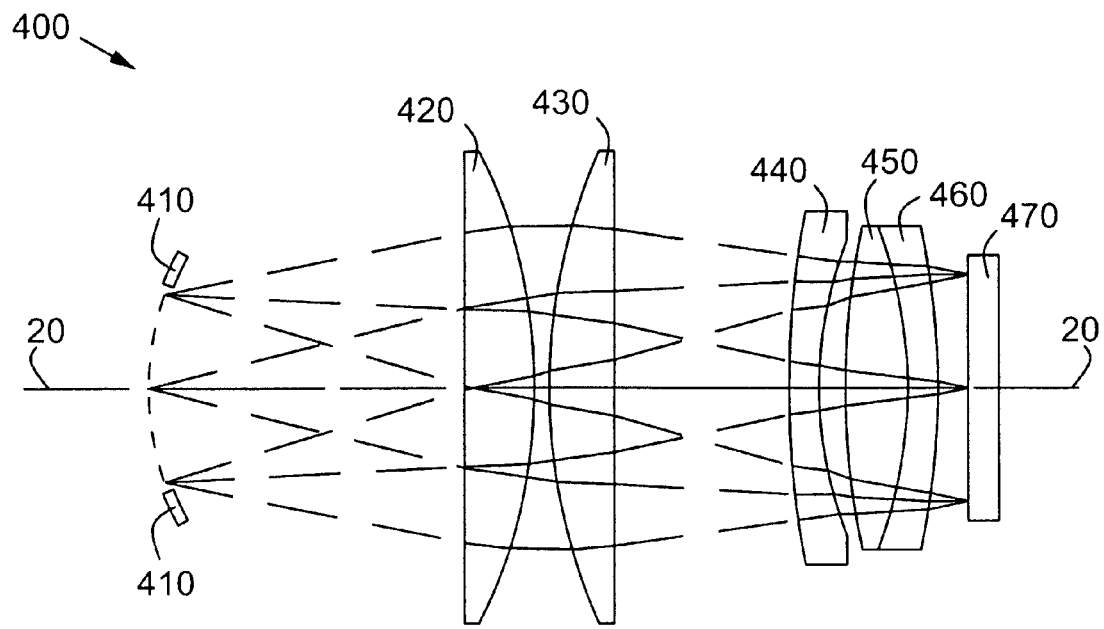
FIGS. 11A-11B are schematic sectional views of the embodiment of the present invention illustrated in FIG. 10, taken along a plane perpendicular to the direction of dispersion.
Figure 11B:
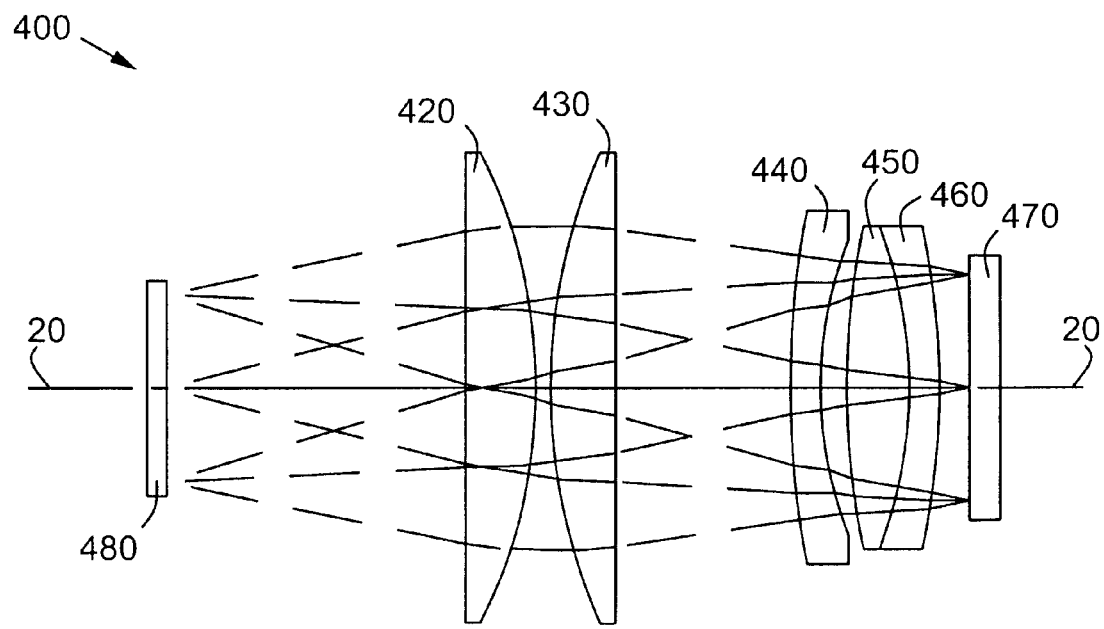

Reference is made to FIGS. 11A-11B, which are schematic sectional views of this same embodiment 400, taken along the optical axis 20 in the plane perpendicular to the direction of dispersion. In operation and referring to FIG. 11A, light emanating from the curved slit element 410 is substantially collimated as it passes through the optical system onto the reflective dispersing element 470. Referring to FIG. 11B, this dispersed light is then imaged as it passes a second time through the same optical system onto the detecting element 480. The curvature of the slit element 410 is balanced against the Petzval curvature of this system to increase the size of the spatial field over the conventional systems.

Figure 12:
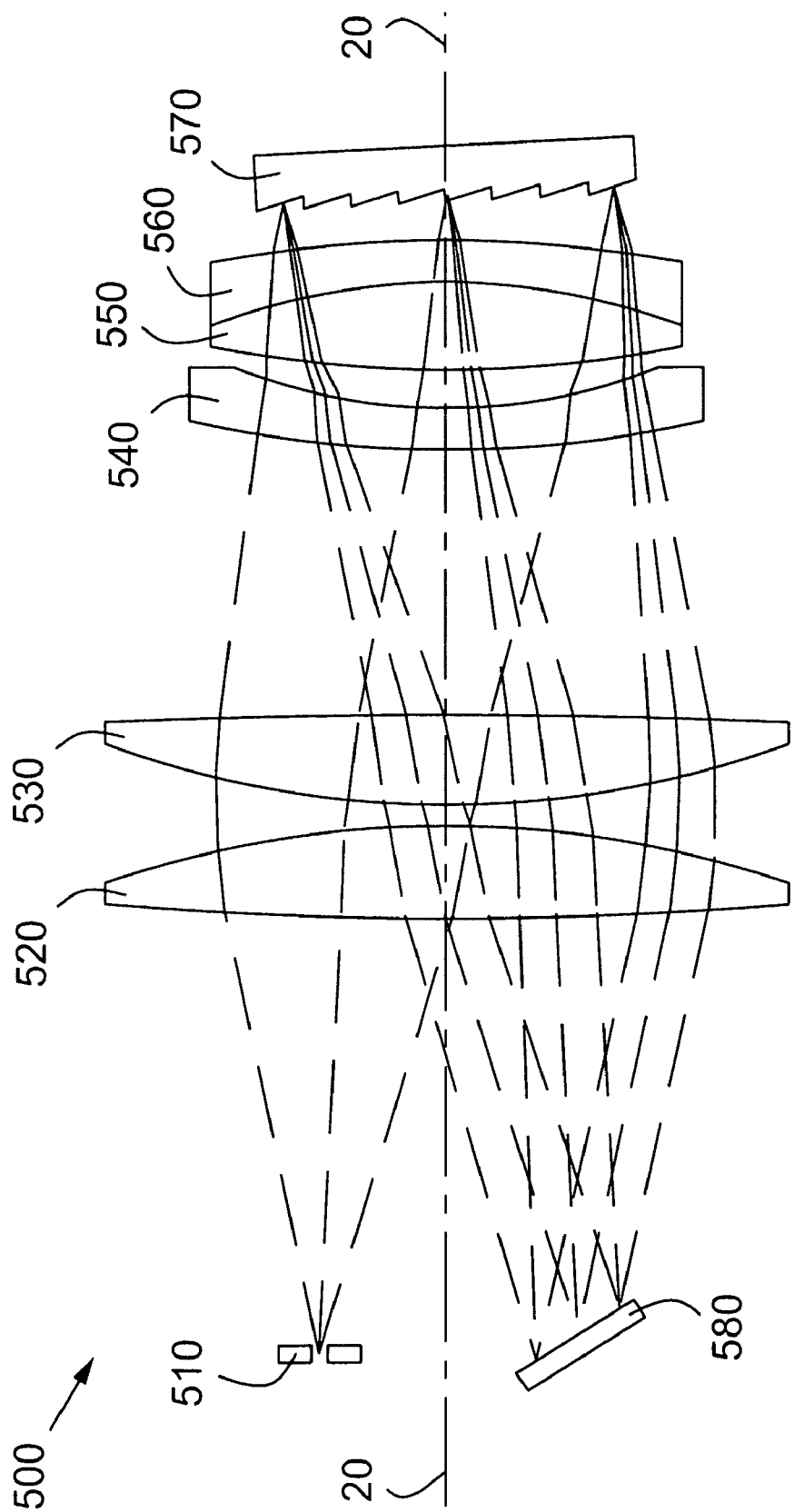
FIG. 12 is a schematic sectional view of a compact wide field spectrometer in accordance with a further embodiment of the present invention, taken along the optical axis in the plane parallel to the direction of dispersion.

The tilt direction of the image plane can be reversed by changing the sign of the diffracting order of the dispersing element that is used. Reference is made to FIG. 12, which is a schematic sectional view of a further embodiment of this invention 500, taken along the optical axis 20 in the plane parallel to the direction of dispersion. In operation, light emanating from the slit element 510 is substantially collimated through an optical system comprised of a combination of optical elements, in this embodiment consisting of refractive elements 520, 530, 540, 550, and 560, onto a dispersing element 570. This dispersed light is then imaged as it passes a second time through the same optical system onto a tilted detecting element 580. The apochromatic balancing of the system axial color with the image plane tilt significantly increases the size of the spectral field over the conventional systems.

Figure 13A:
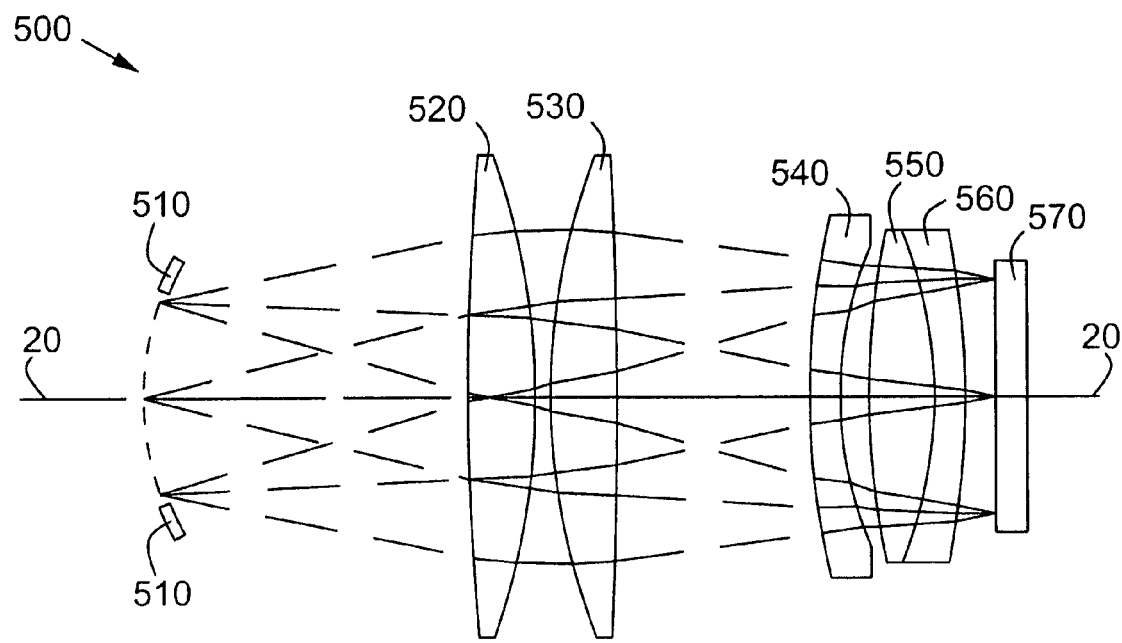
FIGS. 13A-13B are schematic sectional views of the embodiment of the present invention illustrated in FIG. 12, taken along a plane perpendicular to the direction of dispersion.
Figure 13B:
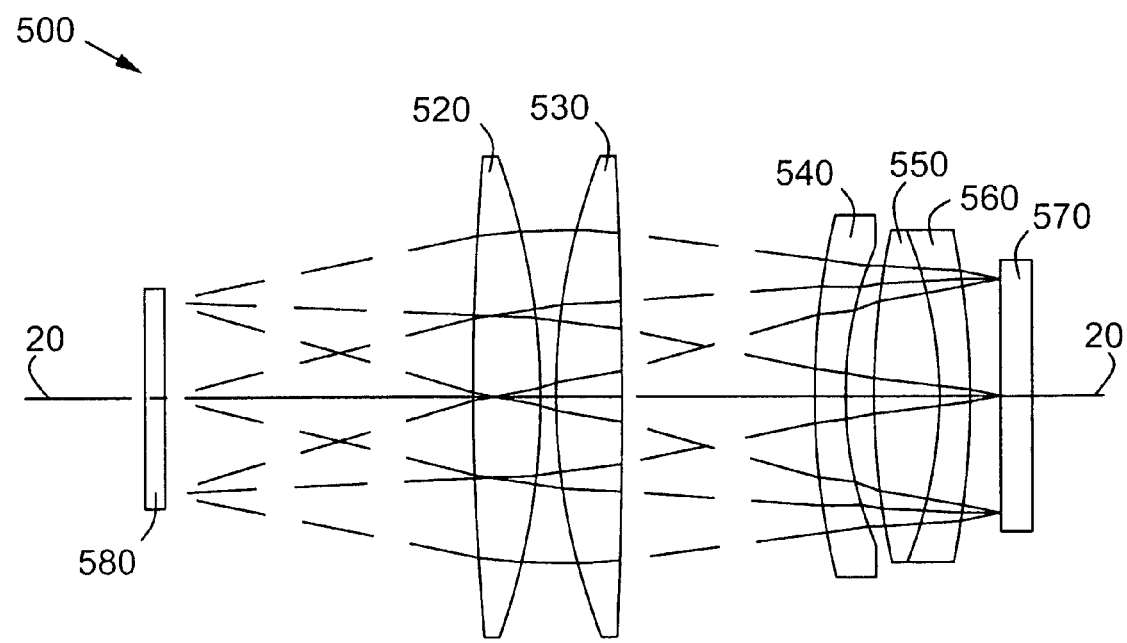

Reference is made to FIGS. 13A-13B, which are schematic sectional views of this same embodiment 500, taken along the optical axis 20 in the plane perpendicular to the direction of dispersion. In operation and referring to FIG. 13A, light emanating from the curved slit element 510 is substantially collimated as it passes through the optical system onto the reflective dispersing element 570. Referring to FIG. 13B, this dispersed light is then imaged as it passes a second time through the same optical system onto the detecting element 580. The curvature of the slit element 510 is balanced against the Petzval curvature of this system to increase the size of the spatial field over the conventional systems.

Other embodiments can be achieved by combining these systems with one of several field curvature correction methods to accommodate the inherent Petzval curvature of compact refractive systems without requiring a curved slit element.

Figure 14:
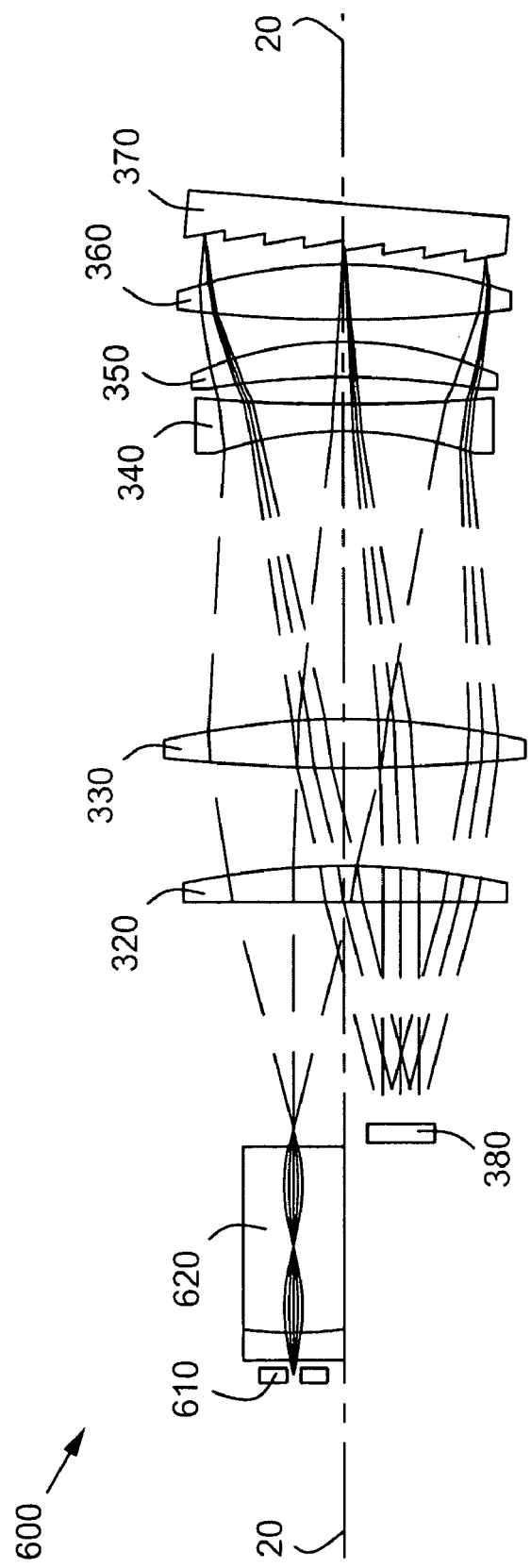
FIG. 14 is a schematic sectional view of a compact wide field spectrometer in accordance with a further embodiment of the present invention that is comprised of the embodiment of the present invention illustrated in FIG. 8, taken along the optical axis in the plane parallel to the direction of dispersion.

Reference is made to FIG. 14, which is a schematic sectional view of a further embodiment of this invention 600, taken along the optical axis 20 in the plane parallel to the direction of dispersion, and illustrates a modification of the embodiment 300 where a field curvature correction device is concatenated with the system. In operation, light emanating from the slit element 610 is first re-imaged by a field curvature conversion device, the preferred embodiment of which is a Gradient Rod Array Field Flattener, or GRAFF, element 620, and then substantially collimated through an optical system comprised of a combination of optical elements, in this embodiment consisting of refractive elements 320, 330, 340, 350, and 360, onto a dispersing element 370. This dispersed light is then imaged as it passes a second time through the same optical system onto a tilted detecting element 380.

Figure 15:
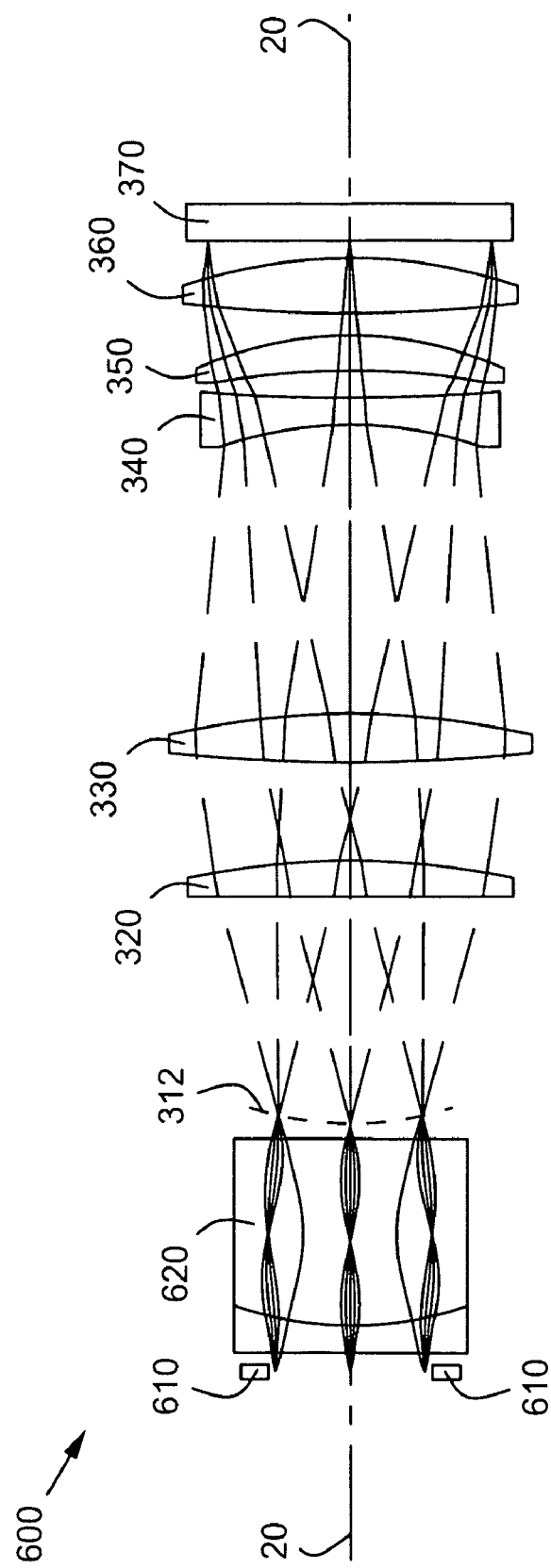
FIG. 15 is a schematic sectional view of the embodiment of the present invention illustrated in FIG. 14, taken along a plane perpendicular to the direction of dispersion.

Reference is made to FIG. 15, which is a schematic sectional view of this same embodiment 600, taken along the optical axis 20 in the plane perpendicular to the direction of dispersion. In operation and referring to FIG. 15, light emanating from the slit element 610 is first re-imaged by the field curvature correction device 620 to the curved image locus 312 that is substantially coincident with the location of the curved slit element 310 of the embodiment 300. This re-imaged light is then substantially collimated as it passes through the optical system onto the reflective dispersing element 370, which then propagates through the system in the same manner as in the unmodified embodiment 300 illustrated in FIG. 9B. In this embodiment, the curvature of the slit element 310 of the unmodified embodiment 300 is eliminated using the field curvature correction device 620, while the wide spatial field of the embodiment 300 is maintained.

Figure 16:
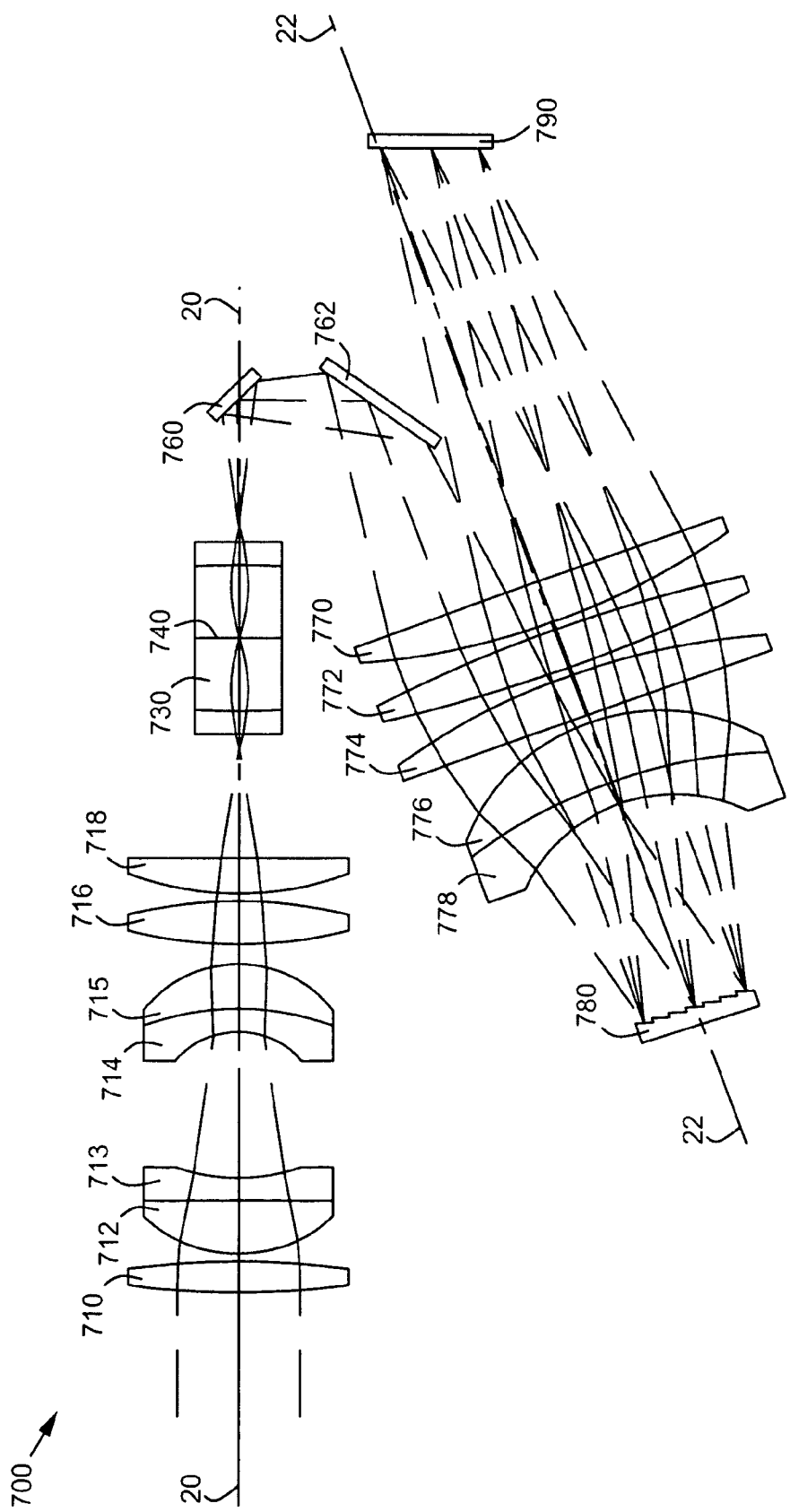
FIG. 16 is a schematic sectional view of a compact wide field hyperspectral imaging system in accordance with a further embodiment of the present invention, taken along the optical axis in the plane parallel to the direction of dispersion.

The use of field curvature correction devices can be extended in general to field curvature converter devices, such that the curved image locus of an imaging system can be converted to the desired curved object locus of the imaging spectrometer. Reference is made to FIG. 16, which is a schematic sectional view of a further embodiment of this invention 700, taken along the optical axis 20 in the plane parallel to the direction of dispersion. In operation, light emitted or reflected by a given object, either real or virtual, is imaged through a first optical system, or imager, comprised of one or more reflective or refractive elements, in this embodiment consisting of refractive elements 710, 712, 713, 714, 715, 716, and 718, and then re-imaged by a field curvature conversion device, the preferred embodiment of which is a gradient rod array field converter element 730, and then substantially collimated through a second optical system, or spectrometer, comprised of a combination of optical elements, in this embodiment consisting of refractive elements 770, 772, 774, 776, and 778, onto a dispersing element 780. This dispersed light is then imaged as it passes a second time through the same second optical system onto a tilted detecting element 790. The slit element 740 is located at a typically flat intermediate image plane within the field curvature conversion device 730, and the mirror elements 760 and 762 are used in this embodiment for the purposes of convenient optical folding.

Figure 17:
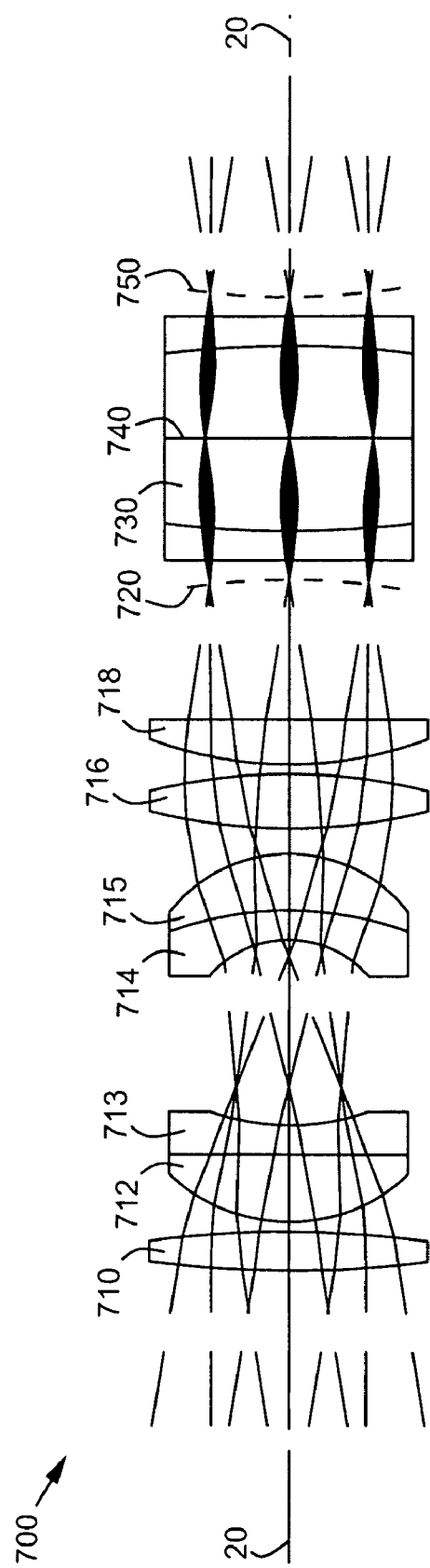
FIG. 17 is a schematic sectional view of the embodiment of the present invention illustrated in FIG. 16, taken along a plane perpendicular to the direction of dispersion.

Reference is made to FIG. 17, which is a schematic sectional view of the imager and field curvature conversion device portion of this same embodiment 700, taken along the optical axis 20 in the plane perpendicular to the direction of dispersion. In operation, light emitted or reflected by a given object, either real or virtual, is imaged through the first optical system to a first curved image locus 720, which is then re-imaged by the field curvature conversion device 730 to the slit element 730, in this embodiment consisting of a flat aperture located within the field curvature conversion device 730, and then re-imaged again to a second curved image locus 750, which serves as the input to the spectrometer portion of this embodiment. The curvature of the first curved image locus 750 is balanced against the Petzval curvature of the first optical system, or imager, portion of this system to increase the size of the spatial field over the conventional systems.

Figure 18A:
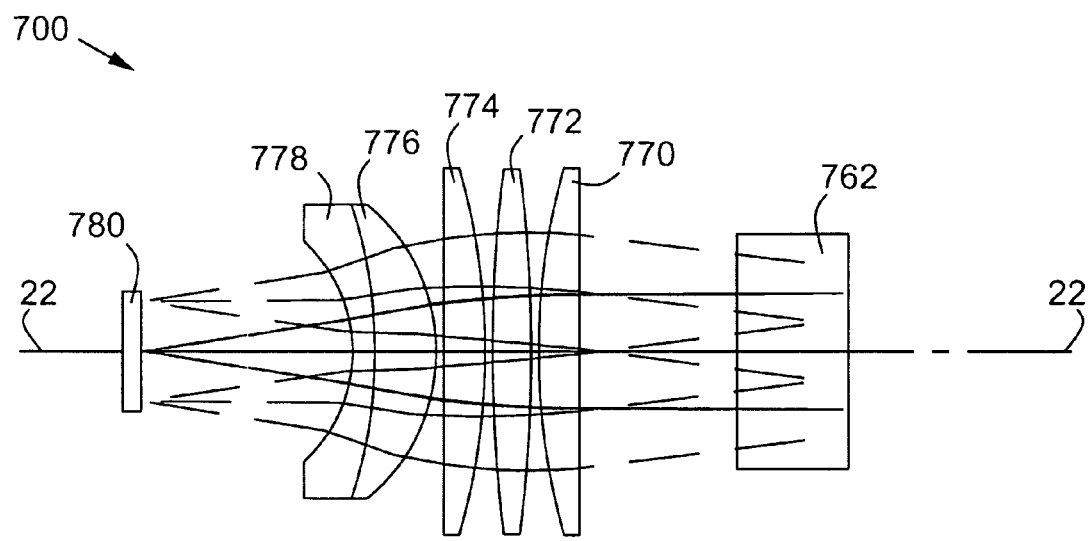
FIGS. 18A-18B are schematic sectional views of the embodiment of the present invention illustrated in FIG. 16, taken along a plane perpendicular to the direction of dispersion.
Figure 18B:
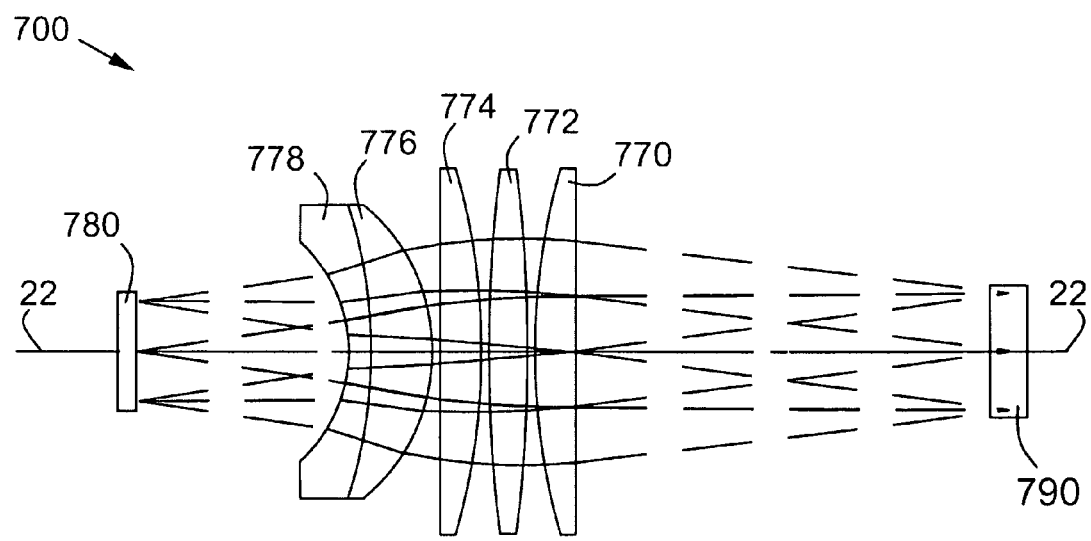

Reference is made to FIGS. 18A-18B, which are schematic sectional views of the spectrometer portion of this same embodiment 700, taken along the optical axis 20 in the plane perpendicular to the direction of dispersion. In operation and referring to FIG. 18A, light emanating from the curved image locus 750 is folded by the mirror elements 760 and 762 and then substantially collimated as it passes through the second optical system onto the reflective dispersing element 780. Referring to FIG. 18B, this dispersed light is then imaged as it passes a second time through the same second optical system onto the detecting element 790. The curvature of the curved image locus 750 is balanced against the Petzval curvature of the second optical system, or spectrometer, portion of this system to increase the size of the spatial field over the conventional systems.

Figure 19:
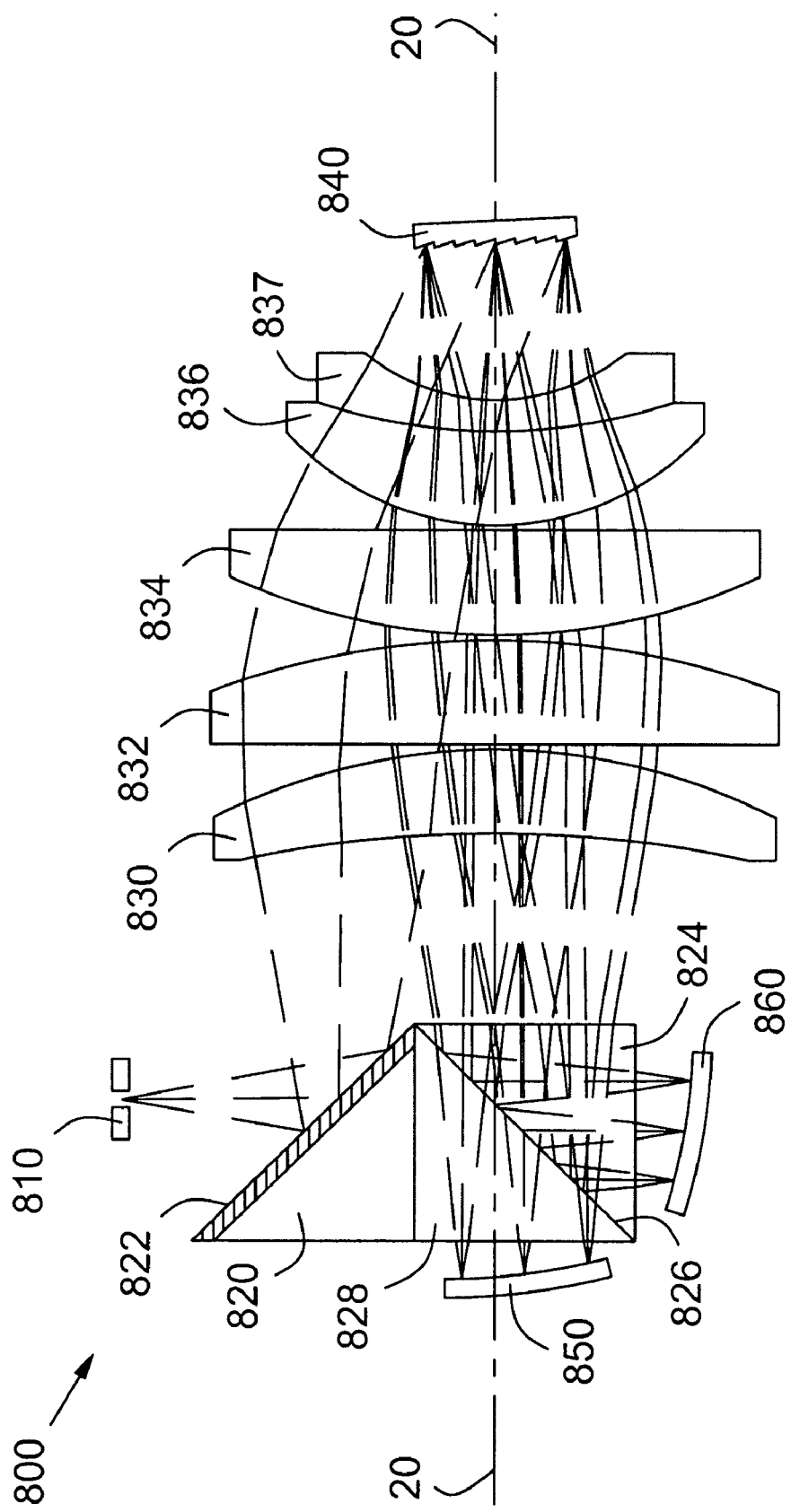
FIG. 19 is a schematic sectional view of a compact wide field spectrometer in accordance with a further embodiment of the present invention, taken along the optical axis in the plane parallel to the direction of dispersion.
Figure 20A:
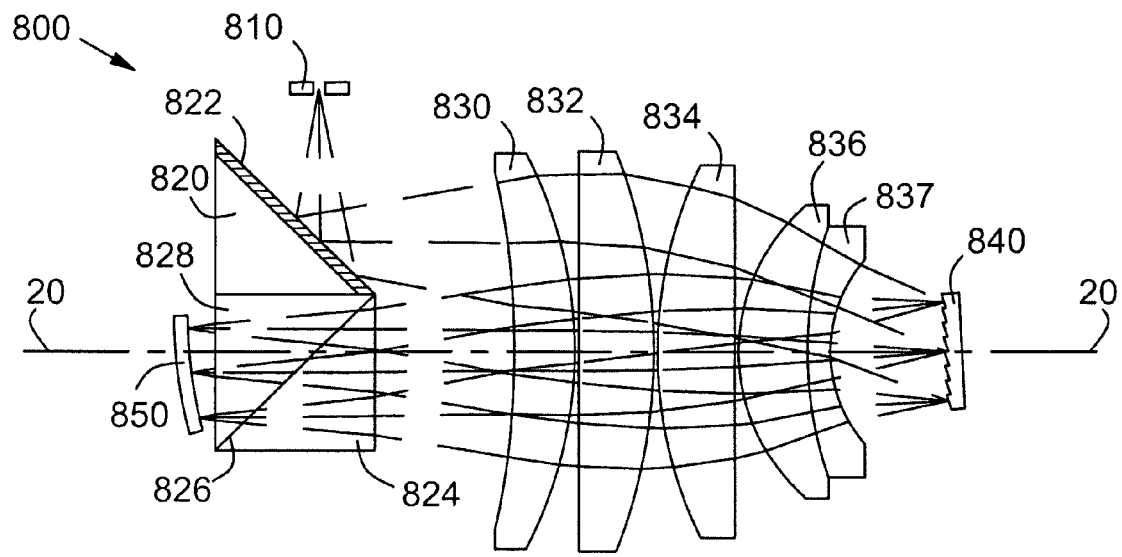
FIGS. 20A-20B are schematic sectional views of the embodiment of the present invention illustrated in FIG. 19, taken along a plane parallel to the direction of dispersion.
Figure 20B:
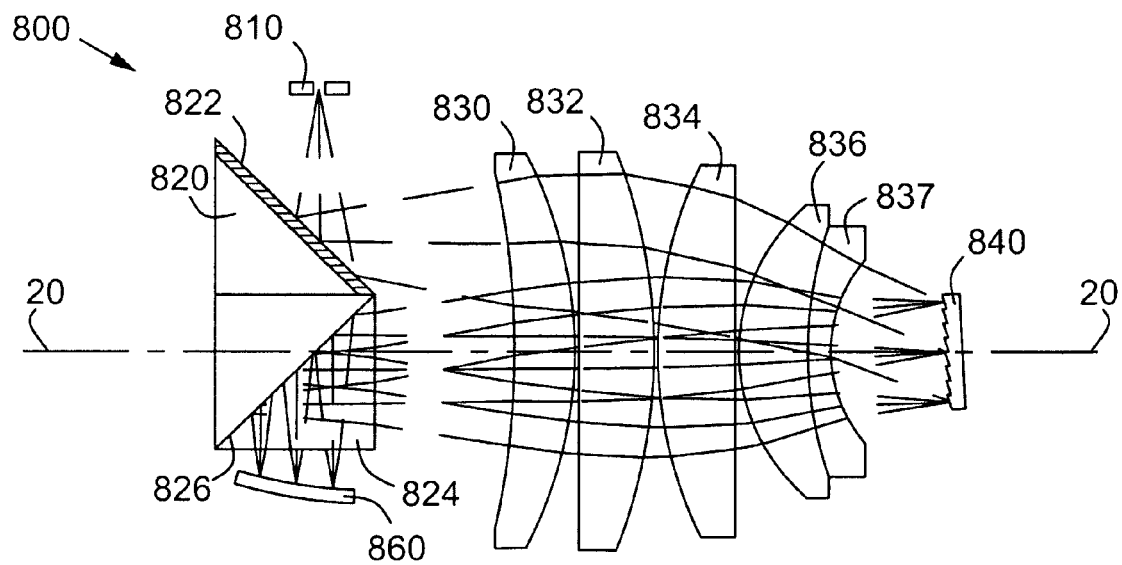

The inherent Petzval curvature of compact refractive systems can also be accommodated using curved detecting elements in order to increase the size of the spectral and spatial fields. Reference is made to FIG. 19, which is a schematic sectional view of a further embodiment of this invention 800, taken along the optical axis 20 in the plane parallel to the direction of dispersion. In operation, light emanating from the slit element 810 is optically folded by a reflecting device, in this embodiment consisting of a prism 820 with a reflective coating 822, and then substantially collimated through an optical system comprised of a combination of optical elements, in this embodiment consisting of refractive elements 830, 832, 834, 836, and 837, onto a dispersing element 840. The light is then separated such that a first spectral band is dispersed into a first diffracted order and a second spectral band is dispersed into a second diffracted order that is different from the first. This dispersed light is then imaged as it passes a second time through the same optical system and through a spectral selection device, the preferred embodiment of which is a cube filter consisting of a first prism 824, a spectrally selective coating 826, and a second prism 828. Referring to FIG. 20A, which is a schematic sectional view of this same embodiment 800, taken along the optical axis 20 in the plane parallel to the direction of dispersion, the first spectral band is transmitted by the cube filter onto a first curved detecting element 850. Referring to FIG. 20B, which is a schematic sectional view of this same embodiment 800, taken along the optical axis 20 in the plane parallel to the direction of dispersion, the second spectral band is redirected by the cube filter onto a second curved detecting element 860.

Figure 21A:
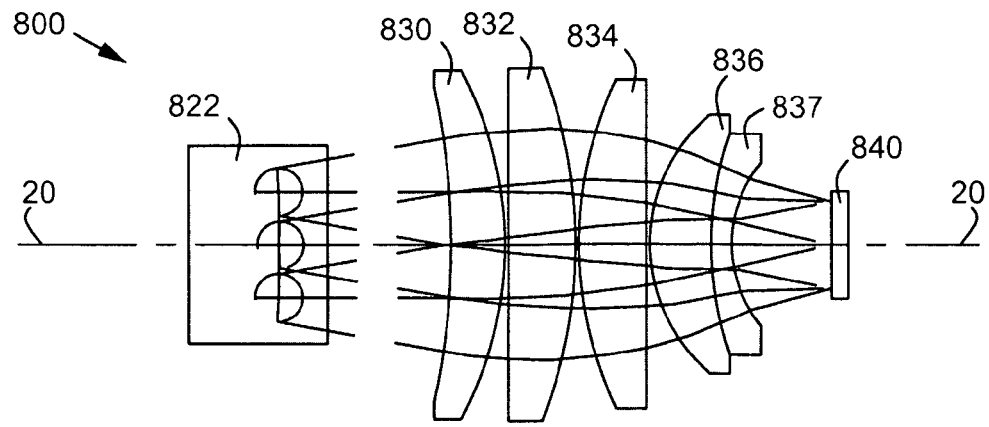
FIGS. 21A-21C are schematic sectional views of the embodiment of the present invention illustrated in FIG. 19, taken along a plane perpendicular to the direction of dispersion.
Figure 21B:
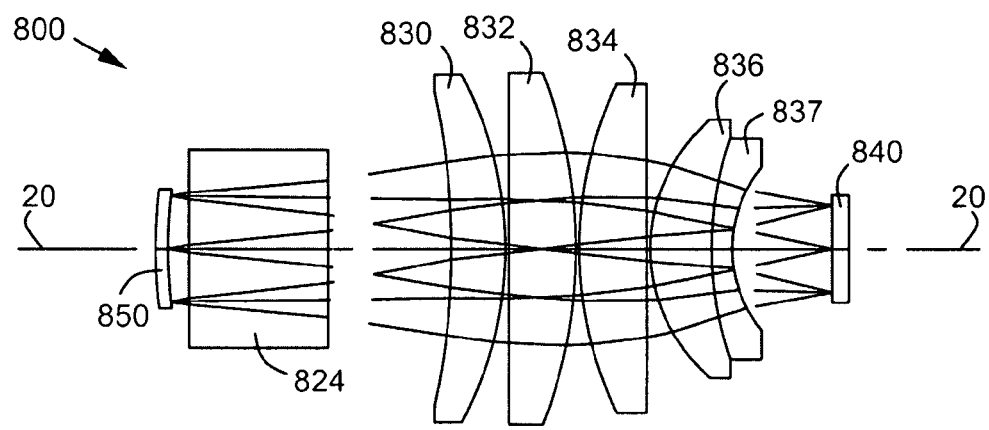
Figure 21C:
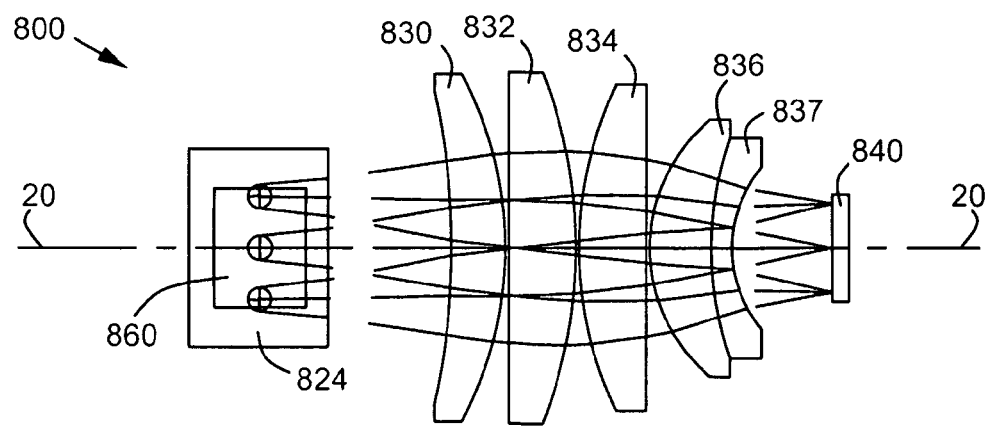

Reference is made to FIGS. 21A-21C, which are schematic sectional views of this same embodiment 800, taken along the optical axis 20 in the plane perpendicular to the direction of dispersion. In operation and referring to FIG. 21A, light emanating from the slit element 310 is optically folded by a reflecting device 820 and then substantially collimated as it passes through the optical system onto the reflective dispersing element 840. Referring to FIG. 21B, the first spectral band is dispersed into a first diffracted order and then imaged as it passes a second time through the same optical system and is transmitted by the spectral selection device onto the first curved detecting element 850. Referring to FIG. 21C, the second spectral band is dispersed into a second diffracted order and then imaged as it passes a second time through the same optical system and is redirected by the spectral selection device onto the second curved detecting element 860. The curvature of the detecting elements 850 and 860 are balanced against the Petzval curvature of this system to increase the size of the spectral and spatial fields over the conventional systems.

Other embodiments can be achieved by combining these systems with one of several field curvature correction methods to accommodate the inherent Petzval curvature of compact refractive systems without requiring curved detecting elements.

Figure 22:
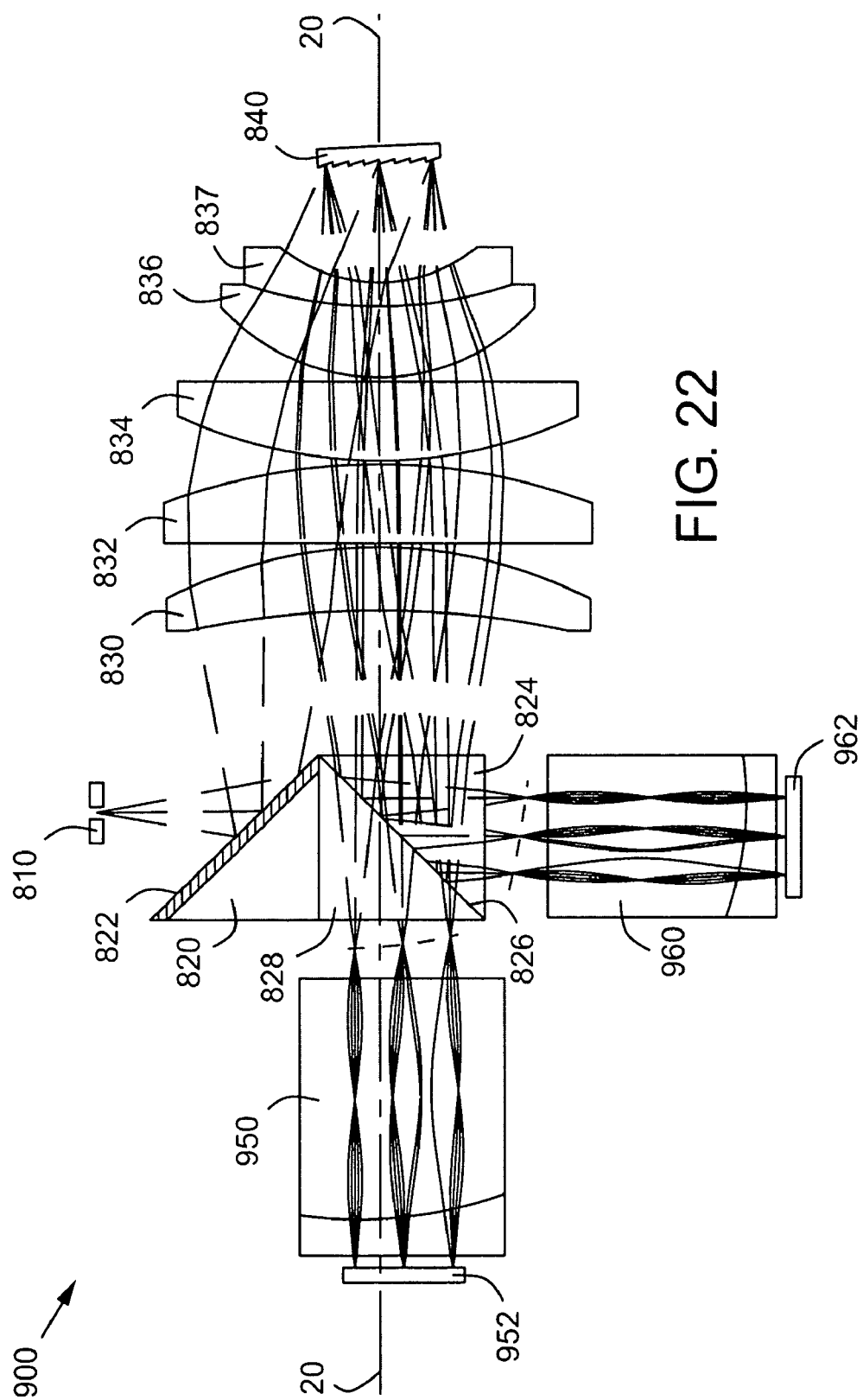
FIG. 22 is a schematic sectional view of a compact wide field spectrometer in accordance with a further embodiment of the present invention that is comprised of the embodiment of the present invention illustrated in FIG. 19, taken along the optical axis in the plane parallel to the direction of dispersion.

Reference is made to FIG. 22, which is a schematic sectional view of a further embodiment of this invention 900, taken along the optical axis 20 in the plane parallel to the direction of dispersion, and illustrates a modification of the embodiment 800 where field curvature correction devices are concatenated with the system. In operation, light emanating from the slit element 810 is optically folded by a reflecting device, in this embodiment consisting of a prism 820 with a reflective coating 822, and then substantially collimated through an optical system comprised of a combination of optical elements, in this embodiment consisting of refractive elements 830, 832, 834, 836, and 837, onto a dispersing element 840. The light is then separated such that a first spectral band is dispersed into a first diffracted order and a second spectral band is dispersed into a second diffracted order that is different from the first. This dispersed light is then imaged as it passes a second time through the same optical system and through a spectral selection device, the preferred embodiment of which is a cube filter consisting of a first prism 824, a spectrally selective coating 826, and a second prism 828. The first spectral band is transmitted by the cube filter and then re-imaged by a first field curvature conversion device, the preferred embodiment of which is a Gradient Rod Array Field Flattener, or GRAFF element 950, onto a first detecting element 952. The second spectral band is redirected by the cube filter and similarly re-imaged by a second field curvature correction device, in this embodiment consisting of a second Gradient Rod Array Field Flattener, or GRAFF element 960 onto a second detecting element 962. In this embodiment, the curvature of the detecting elements 850 and 860 of the unmodified embodiment 800 is substantially eliminated using the field curvature correction devices 950 and 960, while the wide spectral and spatial fields of the embodiment 800 are maintained.

These field curvature correction methods can be combined to further accommodate the inherent Petzval curvature of compact refractive systems without requiring curved slit elements or curved detecting elements, and thereby increase the spectral and spatial fields of these imaging spectrometer systems.

Figure 23:
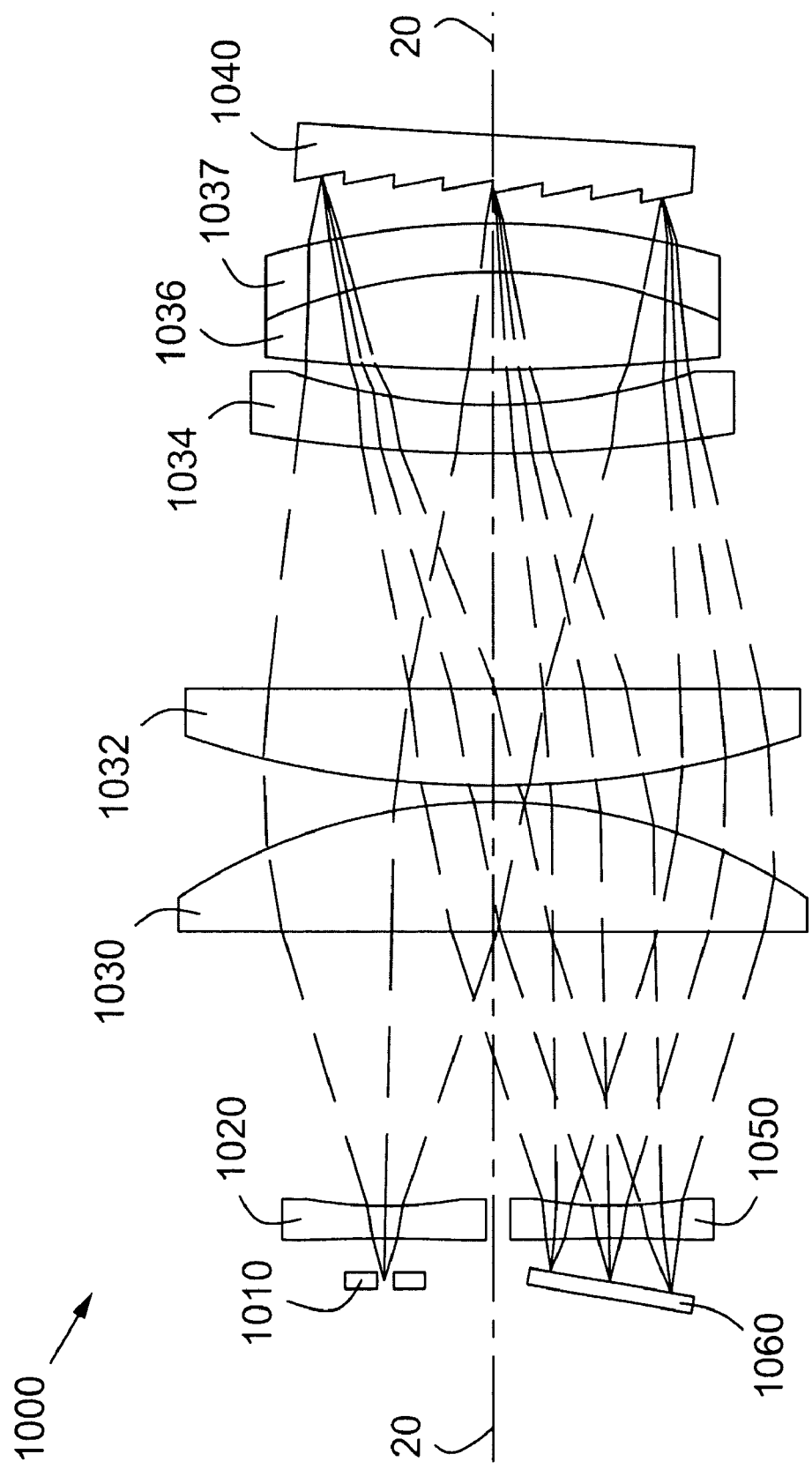
FIG. 23 is a schematic sectional view of a compact wide field spectrometer in accordance with a still further embodiment of the present invention, taken along the optical axis in the plane parallel to the direction of dispersion.

Reference is made to FIG. 23, which is a schematic sectional view of a still further embodiment of this invention 1000, taken along the optical axis 20 in the plane parallel to the direction of dispersion. In operation, light emanating from the slit element 1010 is propagated through a first field curvature correction device, in this embodiment consisting of a first Piazzi-Smyth corrector 1020, which is well known in the art, and then substantially collimated through an optical system comprised of a combination of optical elements, in this embodiment consisting of refractive elements 1030, 1032, 1034, 1036, and 1037, onto a dispersing element 1040. This dispersed light is then imaged as it passes a second time through the same optical system and then propagated through a second field curvature correction device, in this embodiment consisting of a second Piazzi-Smyth corrector 1050, onto a tilted detecting element 1060. The apochromatic balancing of the system axial color with the image plane tilt significantly increases the size of the spectral field over the conventional systems.

Figure 24A:
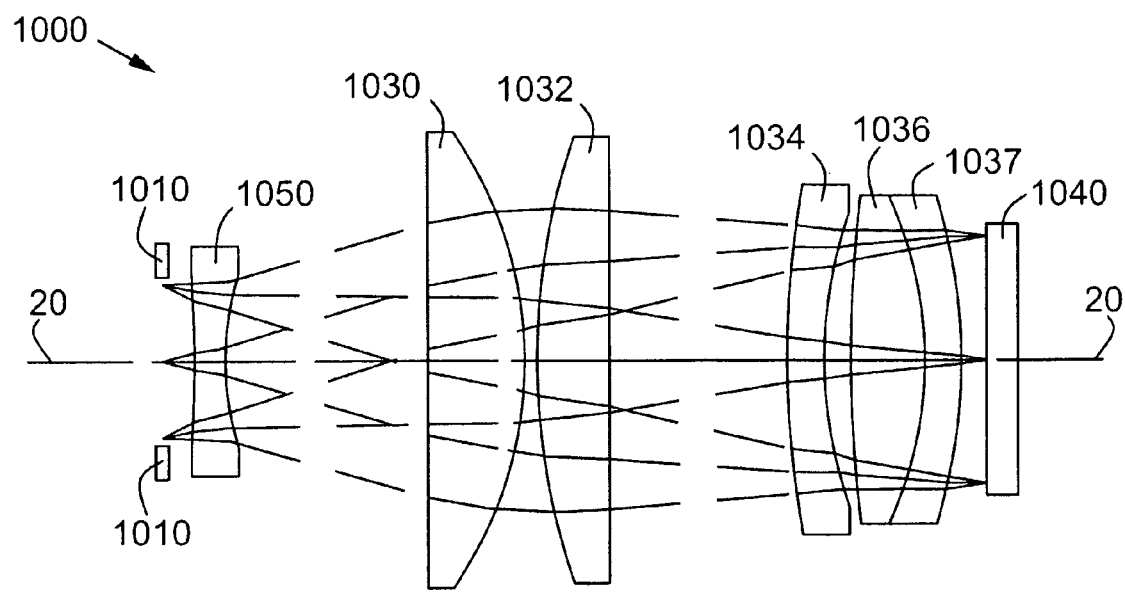
FIGS. 24A-24B are schematic sectional views of the embodiment of the present invention illustrated in FIG. 23, taken along a plane perpendicular to the direction of dispersion.
Figure 24B:
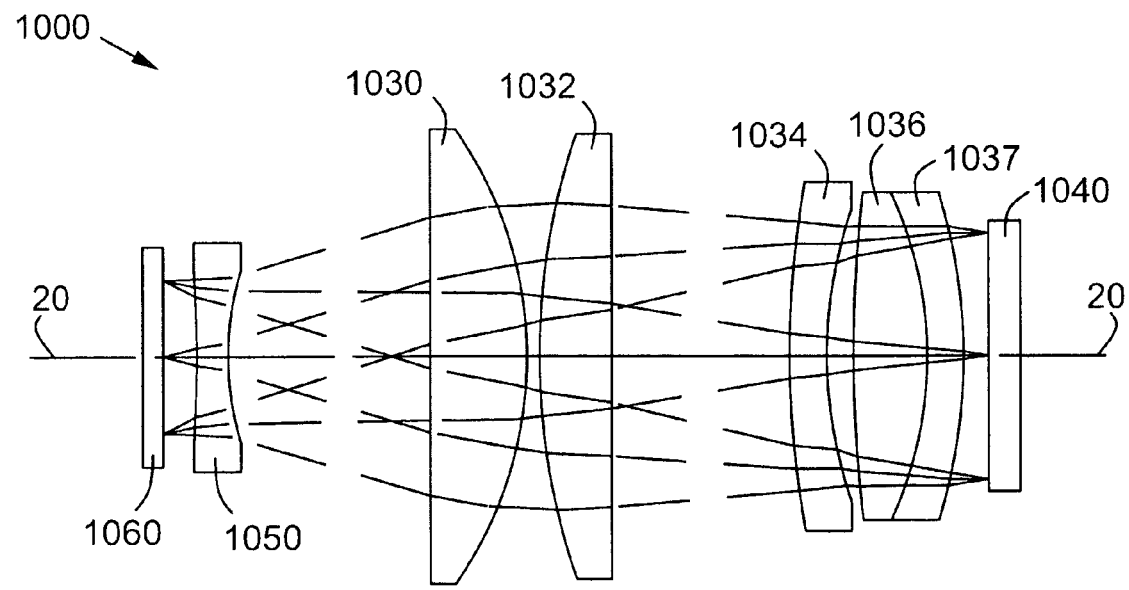

Reference is made to FIGS. 24A-24B, which are schematic sectional views of this same embodiment 1000, taken along the optical axis 20 in the plane perpendicular to the direction of dispersion. In operation and referring to FIG. 24A, light emanating from the slit element 1010 is propagated through a first field curvature correction device, in this embodiment consisting of a first Piazzi-Smyth corrector 1020, and then substantially collimated as it passes through the optical system onto the reflective dispersing element 1040. Referring to FIG. 24B, this dispersed light is then imaged as it passes a second time through the same optical system and then propagated through a second field curvature correction device, in this embodiment consisting of a second Piazzi-Smyth corrector 1050, onto the detecting element 1060. The reduced Petzval curvature of this system, which results in part from the two Piazzi-Smyth correctors, increases the size of the spatial field over the conventional systems.

The above described embodiments of the hyperspectral imaging system of this invention include one or more slit elements, an optical subsystem, one or more reflective dispersive elements located substantially at the backplane, one or more detecting elements located substantially at one or more image planes, and means for substantially compensating Petzval curvature of at least a portion of the hyperspectral imaging system (compensating as used herein includes accommodating, balancing and/or reducing the Petzval curvature). Means for substantially compensating Petzval curvature disclosed above include the use of high index materials, balancing of the linear chromatic correction method with the Petzval curvature of the system, the use of curved slit elements, the use of field curvature correction or converter devices, and the use of curved detecting elements (as shown in FIGS. 3, 4A, 4B, 6, 7A, 7B, 8, 9A, 9B, 10 through 24A, 24B). Although the referenced figures and the above disclosure show, in order to better illustrate the embodiments of the hyperspectral imaging system of this invention, separate means for compensating the Petzval curvature and for increasing the size of the spatial field, it should be noted that the means for compensating the Petzval curvature and for increasing the size of the spatial field disclosed above can be used in combination with each other and that embodiments combining or including more than one of the above disclosed means are also within the scope of this invention.

Although a definite orientation (tilt) of the detecting element (or equivalently of the image plane) has been shown in the figures reference above, it should be noted that other orientations are within the scope of this invention. For example, as disclosed above, the tilt direction of the image plane can be reversed by changing the sign of the diffracting order of the dispersing element that is used.

Although the invention has been described with respect to various embodiments, it should be realized this invention is also capable of a wide variety of further and other embodiments within the spirit and scope of the appended claims.

What is claimed is:

1. A hyperspectral imaging system comprising:
   a slit element;
   an optical sub-system having at least one refractive lens element;
   said optical sub-system substantially collimating, at a back plane, electromagnetic radiation emanating from said at least one slit element;
   at least one reflective dispersive element located substantially at the back plane;
   said at least one reflective dispersive element angularly separating substantially collimated electromagnetic radiation according to wavelength;
   said optical sub-system also imaging, at an image plane, dispersed electromagnetic radiation reflected from said at least one reflective dispersive element; and,
   at least one detecting element located substantially at the image plane;
   an orientation of the image plane being substantially identified by a line perpendicular to the image plane and located at an angle with respect to an optical axis of said optical sub-system; said optical sub-system being symmetrical about the optical axis;
   said at least one detecting element detecting the dispersed electromagnetic radiation reflected from said at least one reflective dispersive element.

2. The hyperspectral imaging system of claim 1 wherein, at each of at least three predetermined wavelengths, the dispersed reflected electromagnetic radiation is focused on one line in the image plane;

whereby a slope of a focal length versus wavelength is substantially equal at said at least three predetermined wavelengths.

3. The hyperspectral imaging system of claim 1 wherein the line perpendicular to the image plane originates at the image plane and comprises a locus of points in a direction of the back plane and towards said optical sub-system.

4. The hyperspectral imaging system of claim 1 wherein the line perpendicular to the image plane originates at the image plane and comprises a locus of points in a direction of the back plane and away from said optical sub-system.

* * * * *